US011272365B2

(12) United States Patent
Lei et al.

(10) Patent No.: US 11,272,365 B2
(45) Date of Patent: *Mar. 8, 2022

(54) NETWORK AUTHENTICATION METHOD, AND RELATED DEVICE AND SYSTEM

(71) Applicant: HUAWEI TECHNOLOGIES CO., LTD., Shenzhen (CN)

(72) Inventors: Zhongding Lei, Singapore (SG); Haiguang Wang, Singapore (SG); Xin Kang, Singapore (SG)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/090,757

(22) Filed: Nov. 5, 2020

(65) Prior Publication Data

US 2021/0058783 A1    Feb. 25, 2021

Related U.S. Application Data

(63) Continuation of application No. 16/399,985, filed on Apr. 30, 2019, now Pat. No. 10,848,970, which is a
(Continued)

(30) Foreign Application Priority Data

Oct. 31, 2016   (CN) .......................... 201610932913.6

(51) Int. Cl.
*H04W 12/06*    (2021.01)
*H04W 8/04*     (2009.01)
(Continued)

(52) U.S. Cl.
CPC ............. *H04W 12/06* (2013.01); *H04W 8/04* (2013.01); *H04W 12/033* (2021.01);
(Continued)

(58) Field of Classification Search
CPC ... H04W 12/06; H04W 12/0013; H04W 8/04; H04W 12/08; H04W 36/0027;
(Continued)

(56) References Cited

U.S. PATENT DOCUMENTS 10,848,970 B2 *  11/2020  Lei .......................... H04W 12/06
2010/0169391 A1   7/2010  Baptist et al.
(Continued)

FOREIGN PATENT DOCUMENTS

CN    101557406 A    10/2009
CN    102625306 A    8/2012
(Continued)

OTHER PUBLICATIONS

3GPP TR 33.899 V0.3.0 (Jul. 2016),3rd Generation Partnership Project;Technical Specification Group Services and System Aspects; Study on the security aspects of the next generation system(Release 14),total 77 pages. XP051123542. (Cited from Parent Application).
(Continued)

*Primary Examiner* — Matthew C Sams

(57) ABSTRACT

This application discloses a network authentication method, and a related device and system. The method includes: receiving, by a network authentication network element, an access request sent by user equipment, where the access request includes identification information of the user equipment; verifying, by the network authentication network element, whether the identification information is valid, and if the identification information is valid, determining, based on the identification information, a slice authentication network element corresponding to the user equipment; and sending, by the network authentication network element, the identification information to the slice authentication network element corresponding to the user equipment, where the identification information is used by the slice authentication
(Continued)

network element corresponding to the user equipment to generate authentication data for the user equipment and initiate a user authentication request to the user equipment by using the authentication data.

16 Claims, 21 Drawing Sheets

Related U.S. Application Data continuation of application No. PCT/CN2017/107989, filed on Oct. 27, 2017.

(51) Int. Cl.
- H04W 12/08 (2021.01)
- H04W 48/08 (2009.01)
- H04W 48/16 (2009.01)
- H04W 12/033 (2021.01)

(52) U.S. Cl.
CPC ........... *H04W 12/08* (2013.01); *H04W 48/08* (2013.01); *H04W 48/16* (2013.01)

(58) Field of Classification Search
CPC ......... H04W 8/02; H04W 8/22; H04W 48/08; H04W 48/16; H04L 41/0246; H04L 41/042

See application file for complete search history.

(56) References Cited

U.S. PATENT DOCUMENTS

| | | | |
|---|---|---|---|
| 2011/0286595 A1 | 11/2011 | Resch et al. | |
| 2017/0164212 A1* | 6/2017 | Opsenica | H04L 41/0246 |
| 2017/0289791 A1* | 10/2017 | Yoo | H04W 68/005 |
| 2017/0318450 A1* | 11/2017 | Salkintzis | H04W 36/0027 |
| 2017/0332421 A1* | 11/2017 | Sternberg | H04W 12/062 |
| 2018/0007552 A1* | 1/2018 | Bae | H04L 63/08 |
| 2018/0343249 A1* | 11/2018 | Hahn | H04W 12/06 |
| 2019/0110195 A1* | 4/2019 | Ito | H04W 12/033 |
| 2019/0141081 A1* | 5/2019 | Kunz | H04W 12/08 |
| 2019/0166493 A1* | 5/2019 | You | H04W 12/037 |
| 2019/0199532 A1* | 6/2019 | Zhang | H04L 9/3242 |
| 2019/0246270 A1* | 8/2019 | Ito | H04W 12/06 |
| 2019/0261178 A1* | 8/2019 | Rajadurai | H04W 12/03 |
| 2019/0261180 A1* | 8/2019 | Lei | H04W 12/06 |

FOREIGN PATENT DOCUMENTS

| | | | |
|---|---|---|---|
| CN | 106060900 A | 10/2016 | |
| WO | WO-2017188064 A1 * | 11/2017 | ........ H04W 12/0433 |
| WO | WO-2018006985 A1 * | 1/2018 | ............ H04W 92/16 |

OTHER PUBLICATIONS

3GPP TSG SA WG3 (Security) Meeting #84, S3-161262, Huawei, HiSilicon:"The Authentication and Authorization Scenarios of UE Accessing into Network Slicing", Jul. 25-29, 2016 Chennal (India) , total 3 pages. XP051139469. (Cited from Parent Application).

NEC, "pCR to TR 33,899 Proposal of soiution for key issue of network slicing security", 3GPP TSG SA WG3 (Security) Meeting #84 S3-161265(revision of S3-160953), Jul. 25-29, 2016, Chennai, India, total 3 pages. (Cited from Parent Application).

3GPP TS 33.401 V14.0.0 (Sep. 2016);3rd Generation Partnership Project; Technical Specification Group Services and System Aspects; 3GPP System Architecture Evolution (SAE); Security architecture(Release 14), total 152 pages. (Cited from Parent Application).

* cited by examiner

NETWORK AUTHENTICATION METHOD, AND RELATED DEVICE AND SYSTEM

CROSS-REFERENCE TO RELATED APPLICATIONS

This application is a continuation of U.S. patent application Ser. No. 16/399,985, filed on Apr. 30, 2019, which is a continuation of International Application No. PCT/CN2017/107989, filed on Oct. 27, 2017, which claims priority to Chinese Patent Application No. 201610932913.6, filed on Oct. 31, 2016. All of the afore-mentioned patent applications are hereby incorporated by reference in their entireties.

TECHNICAL FIELD

This application relates to the field of network security technologies of mobile communications networks, and in particular, to a network authentication method and a related device and system.

BACKGROUND

Network slicing is an important technology in 5G and a future communications network. Thanks to a feature of service-oriented network configuration, network slicing becomes a key driving force of future network development. New services are quickly launched; diversified business models are supported, and differential functions, performance, and security protection are provided, to meet requirements of different applications and industries; and customer innovation is enabled, operation and maintenance is simplified, and operating expenses are reduced. Diversity and flexibility of network slicing bring huge challenges to architecture and protocol process designs of the network slicing. How to design a secure and efficient authentication protocol for user equipment UE) to access a network slice becomes an important problem that urgently needs to be resolved in a 5G network. It needs to be ensured that user equipment (a mobile communications terminal or an IoT (Internet of Things,) can quickly access a network slice and obtain a personalized service while being provided with required network access security protection against an external attack.

In an existing mobile communications network (3G/LTE), user authentication based on a pre-shared key is used between user equipment and an MNO network. The pre-shared key is a symmetric key that is pre-placed on a SIM card of the user equipment and on a home subscriber server (HSS) of a core network. During authentication, the AKA (Authentication and Key Agreement) protocol described in 3GPP TS 33.401 is used. The user authentication based on the pre-shared key may be shown in FIG. 1. The UE and the HSS store the pre-shared key. During authentication, a mobility management entity (MME) obtains an authentication vector (AV) from the HSS, and performs user authentication on the UE. A specific process includes the following steps.

Step 1: The UE sends an access request to the MME. The network attach request includes information such as an international mobile subscriber identity (IMSI) and user equipment security capability (UE security capability).

Step 2: After receiving access request, the MME sends a network attach authentication data request to the HSS. The network attach data request includes the IMSI, a service network identity (SN ID), and a network type.

Step 3: After receiving the authentication data request, the HSS finds a corresponding key K based on the IMSI, and then calculates an authentication vector. Input parameters for calculating the authentication vector include the key K, a random number RAND, the SN ID, an SQN (sequence number). Output parameters include a network authentication token AUTN_HSS, an XRES (expected authentication response), and an ASME key (K_ASME).

Step 4: The HSS sends the authentication vector to the MME by using an authentication data response (Authentication Data Response).

Step 5: The MME stores the authentication vector.

Step 6: The MME initiates a user authentication request (User Authentication Request) to the UE. The user authentication request includes the random number RAND, the authentication token AUTN_HSS, and the ASME key (K_ASME).

Step 7: After receiving the authentication token RAND and AUTN_HSS, the UE calculates a network authentication token AUTN_UE by using an EPS AKA key algorithm. Input parameters of the calculation include the key K, the random number RAND, the SN ID, and the SQN. Output parameters should include the network authentication token AUTN_UE, an authentication response RES, and an ASME key (K_ASME). The UE verifies whether the network authentication tokens AUTN_UE and AUTN_HSS are the same, to verify the core network.

Step 8: The UE sends a user authentication response (User Authentication Response) to the MME. The user authentication response includes the RES.

Step 9: After receiving the RES, the MME determines whether the RES is the same as the XRES, to authenticate the UE.

A main feature of the authentication manner shown in FIG. 1 is that authentication needs to be independently performed between each UE and the core network (Core Network, CN). During authentication, the MME needs to obtain an authentication vector from the HSS each time, but the HSS is a centralized device. Therefore, if authentication needs to be simultaneously performed for a large quantity of UEs, authentication efficiency is relatively low.

FIG. 2A shows an existing authentication manner for UE to access a network slice. As shown in FIG. 2A, before accessing a slice, each UE first needs to perform an MNO (mobile network operator) network authentication process. In other words, each UE needs to undergo two times of authentication before accessing the slice. First authentication is MNO network authentication. For details, refer to step 1. An authentication process of the first authentication is similar to that of the authentication manner described in FIG. 1. Second authentication is slice authentication. After the network authentication is completed, a network may initiate an authentication process for the slice.

Compared with single authentication, the authentication manner shown in FIG. 2A requires at least a twofold workload and authentication time. In addition, more importantly, user authentication needs to be independently performed between each UE and the network. If authentication needs to be simultaneously performed for a large quantity of UEs, a network server (a centralized device) needs to process authentication and vector operations for the large quantity of UEs, and authentication efficiency rapidly decreases.

FIG. 2B shows another existing authentication manner for UE to access a network slice. As shown in FIG. 2B, single intra-slice authentication is performed to quickly access a slice. In this authentication manner, network authentication is omitted, and the intra-slice authentication is directly performed. However, this also causes some problems: In this processing manner, each slice is similar to a completely independent dedicated network, and is not constrained or controlled by an MNO network. In addition, UE needs to know a slice ID in advance, to ensure that the UE can access a correct slice.

SUMMARY

This application provides a network authentication method, and a related device and system, so that user equipment can quickly and efficiently access a network slice, and security protection is ensured when the user equipment accesses a network.

According to a first aspect, this application provides a network authentication system, where the system includes: user equipment, a network authentication network element, and a slice authentication network element, where
the user equipment is configured to send an access request to the network authentication network element, where the access request carries identification information of the user equipment;
the network authentication network element is configured to: receive the access request; verify whether some or all of the identification information is valid; and if some or all of the identification information is valid, determine, based on the some or all of the identification information that is valid, a slice authentication network element corresponding to the user equipment, and send the some or all of the identification information to the slice authentication network element corresponding to the user equipment;
the slice authentication network element is configured to: receive the some or all of the identification information sent by the network authentication network element, generate authentication data for the user equipment based on the some or all of the identification information, and initiate a user authentication request to the user equipment by using the authentication data; and
the user equipment is further configured to: receive the user authentication request initiated by the slice authentication network element, and respond to the user authentication request.

In the foregoing system, for user equipment that needs to be access a network slice, an MNO core network first verifies validity of the user equipment, and then the network slice initiates a user authentication request to the user equipment. For an access request of the user equipment, the MNO core network does not need to request a network server (for example, an HSS) to perform calculation and generate authentication data (for example, an authentication vector AV) for the user equipment. This greatly improves network slice access efficiency of the user equipment. In addition, because the network needs to verify the validity of the user equipment, control rights of the network on the user equipment are also ensured.

With reference to the first aspect, in a first possible implementation, the identification information may include at least a first identifier, and the first identifier is network-side identification information of the user equipment.

With reference to the first aspect, in a second possible implementation, the identification information may include at least a first identifier and a second identifier, the first identifier is network-side identification information of the user equipment, and the second identifier includes at least one of a service identifier and a physical identifier.

With reference to the second possible implementation of the first aspect, in some embodiments, the network authentication network element may be in some embodiments configured to send the second identifier to the slice authentication network element; and the slice authentication network element is in some embodiments configured to: generate the authentication data based on the second identifier, and initiate the user authentication request to the user equipment by using the authentication data.

With reference to the second possible implementation of the first aspect, in some embodiments, the network authentication network element may be in some embodiments configured to send the first identifier and the second identifier to the slice authentication network element; and the slice authentication network element is in some embodiments configured to: generate the authentication data based on the first identifier and the second identifier, and initiate the user authentication request to the user equipment by using the authentication data.

With reference to the first aspect, in a third possible implementation, the user equipment is corresponding to a plurality of network slices; and the slice authentication network element is further configured to: generate, based on the some or all of the identification information sent by the network authentication network element, authentication data of each of the plurality of network slices for the user equipment, and initiate, to the user equipment, a security authentication request for each of the network slices by using the authentication data of each of the plurality of network slices for the user equipment.

With reference to the first aspect, in a fourth possible implementation, the user equipment is corresponding to a plurality of network slices; the network authentication network element is in some embodiments configured to: determine, based on the some or all of the identification information that is valid, a slice authentication network element corresponding to each of the plurality of network slices, and send the some or all of the identification information to the slice authentication network element corresponding to each of the plurality of network slices; and the slice authentication network element corresponding to each of the plurality of network slices is configured to: generate authentication data for the user equipment, and initiate a user authentication request to the user equipment by using the authentication data of each of the plurality of network slices for the user equipment.

With reference to the first aspect, or with reference to the foregoing possible implementations of the first aspect, in some embodiments, the user equipment is further configured to: before sending the access request, encrypt the identification information by using a first encryption key; a decryption key corresponding to the first encryption key is configured on a side of the network authentication network element; and the network authentication network element is configured to decrypt the encrypted identification information by using the decryption key corresponding to the first encryption key.

With reference to the first aspect, or with reference to the foregoing possible implementations of the first aspect, in some embodiments, the user equipment is further configured to: when sending the access request to the network authentication network element, send, to an access-network network element, access-network-side decodable signaling carrying the identification information and/or access assistance information related to the user equipment; and the accessnetwork-side decodable signaling is used by the access-network network element to perform access control on the access request of the user equipment based on the identification information and/or the access assistance information.

In some embodiments, the user equipment is further configured to: before sending the access-network-side decodable signaling, encrypt, by using a second encryption key, the identification information and/or the access assistance information carried in the access-network-side decodable signaling; a decryption key corresponding to the second encryption key is configured on a side of the access-network network element; and the access-network network element is configured to decrypt the encrypted identification information and/or access assistance information by using the decryption key corresponding to the first encryption key.

According to a second aspect, this application provides a network authentication network element, where the network authentication network element includes:
 a receiving unit, configured to receive an access request sent by user equipment, where the access request includes identification information of the user equipment;
 a verification unit, configured to: verify whether some or all of the identification information is valid; and if some or all of the identification information is valid, determine, based on the some or all of the identification information that is valid, a slice authentication network element corresponding to the user equipment; and
 a sending unit, configured to send the some or all of the identification information to the slice authentication network element corresponding to the user equipment, where the some or all of the identification information that is sent is used by the slice authentication network element corresponding to the user equipment to generate authentication data for the user equipment and initiate a user authentication request to the user equipment by using the authentication data.

By running the foregoing units, for user equipment that needs to access a network slice, an MNO core network merely needs to verify validity of the user equipment, and then trigger the network slice to initiate a user authentication request to the user equipment. This greatly improves network slice access efficiency of the user equipment. In addition, because the network needs to verify the validity of the user equipment, control rights of the network on the user equipment are also ensured.

With reference to the second aspect, in a first possible implementation, the identification information may include at least a first identifier, and the first identifier is network-side identification information of the user equipment.

With reference to the second aspect, in a second possible implementation, the identification information may include at least a first identifier and a second identifier, the first identifier is network-side identification information of the user equipment, and the second identifier includes at least one of a service identifier and a physical identifier.

With reference to the second possible implementation of the second aspect, in some embodiments, the sending unit may be in some embodiments configured to send the second identifier to the slice authentication network element; and the slice authentication network element is configured to: generate the authentication data based on the second identifier, and initiate the user authentication request to the user equipment by using the authentication data.

With reference to the second possible implementation of the second aspect, in some embodiments, the sending unit may be in some embodiments configured to send the first identifier and the second identifier to the slice authentication network element; and the slice authentication network element is configured to: generate the authentication data based on the first identifier and the second identifier, and initiate the user authentication request to the user equipment by using the authentication data.

With reference to the second aspect, or with reference to the foregoing possible implementations of the second aspect, in some embodiments, the user equipment is corresponding to a plurality of network slices; the verification unit may be in some embodiments configured to: determine, based on the some or all of the identification information that is valid, a slice authentication network element corresponding to each of the plurality of network slices; the sending unit may be in some embodiments configured to send the some or all of the identification information to the slice authentication network element corresponding to each of the plurality of network slices; and the slice authentication network element corresponding to each of the plurality of network slices may be configured to: generate authentication data for the user equipment, and initiate a user authentication request to the user equipment by using the authentication data of each of the plurality of network slices for the user equipment.

According to a third aspect, this application provides a slice authentication network element, where the slice authentication network element includes:
 a receiving unit, configured to receive identification information of user equipment that is sent by a network authentication network element;
 a calculation unit, configured to generate authentication data for the user equipment based on the identification information; and
 an authentication unit, configured to initiate a user authentication request to the user equipment by using the authentication data.

By running the foregoing units, for user equipment that needs to access a network slice, an MNO core network merely needs to verify validity of the user equipment, and then the network slice initiates a user authentication request to the user equipment. This greatly improves network slice access efficiency of the user equipment. In addition, because the network needs to verify the validity of the user equipment, control rights of the network on the user equipment are also ensured.

With reference to the third aspect, in a first possible implementation, the identification information may include at least a first identifier, and the first identifier is network-side identification information of the user equipment.

With reference to the third aspect, in a second possible implementation, the identification information may include at least a first identifier and a second identifier, the first identifier is network-side identification information of the user equipment, and the second identifier includes at least one of a service identifier and a physical identifier.

With reference to the second possible implementation of the third aspect, in some embodiments, the receiving unit may be in some embodiments configured to receive the first identifier and the second identifier sent by the network authentication network element, and the calculation unit may be in some embodiments configured to generate the authentication data for the user equipment based on the first identifier and the second identifier.

With reference to the third aspect, or with reference to the foregoing possible implementations of the third aspect, in some embodiments, the calculation unit may be in some embodiments configured to generate, based on the identification information, authentication data of each of a plurality of network slices for the user equipment; and the authentication unit may be in some embodiments configured to initiate, to the user equipment, a security authentication request for each of the network slices by using the authentication data of each of the plurality of network slices for the user equipment.

According to a fourth aspect, this application provides user equipment, where the user equipment includes:

a sending unit, configured to send an access request to a network authentication network element, where the access request carries identification information of the user equipment; and a receiving unit, configured to: receive a user authentication request initiated by a slice authentication network element, and respond to the user authentication request, where the network authentication network element is configured to: determine whether some or all of the identification information is valid, and if some or all of the identification information is valid, determine, based on the some or all of the identification information that is valid, the slice authentication network element corresponding to the user equipment; and the slice authentication network element is configured to: generate authentication data for the user equipment based on the some or all of the identification information, and initiate the user authentication request to the user equipment by using the authentication data.

By running the foregoing units, for user equipment that needs to access a network slice, an MNO core network merely needs to first verify validity of the user equipment, and then trigger the network slice to initiate a user authentication request to the user equipment. This greatly improves network slice access efficiency of the user equipment. In addition, because the network needs to verify the validity of the user equipment, control rights of the network on the user equipment are also ensured.

With reference to the fourth aspect, in a first possible implementation, the identification information may include at least a first identifier, and the first identifier is network-side identification information of the user equipment.

With reference to the fourth aspect, in a second possible implementation, the identification information may include at least a first identifier and a second identifier, the first identifier is network-side identification information of the user equipment, and the second identifier includes at least one of a service identifier and a physical identifier.

With reference to the fourth aspect, or with reference to the foregoing possible implementations of the fourth aspect, in some embodiments, the sending unit may be further configured to: when sending the access request to the network authentication network element, send, to an access-network network element, access-network-side decodable signaling carrying the identification information and/or access assistance information related to the user equipment; and the access-network-side decodable signaling may be used by the access-network network element to perform access control on the access request of the user equipment based on the identification information and/or the access assistance information.

With reference to the fourth aspect, or with reference to the foregoing possible implementations of the fourth aspect, in some embodiments, the user equipment may further include a first encryption unit, configured to: before the sending unit sends the access request, encrypt the identification information by using a first encryption key, where a decryption key corresponding to the first encryption key is configured on a side of the network authentication network element, and the network authentication network element is configured to decrypt the encrypted identification information by using the decryption key corresponding to the first encryption key.

With reference to the fourth aspect, or with reference to the foregoing possible implementations of the fourth aspect, in some embodiments, the user equipment may further include a second encryption unit, configured to: before the sending unit sends the access-network-side decodable signaling, encrypt, by using a second encryption key, the identification information and/or the access assistance information carried in the access-network-side decodable signaling, where a decryption key corresponding to the second encryption key is configured on a side of the access-network network element, and the access-network network element is configured to decrypt the encrypted identification information and/or access assistance information by using the decryption key corresponding to the first encryption key.

According to a fifth aspect, this application provides a network authentication method, applied to a side of a network authentication network element, where the method includes: receiving, by the network authentication network element, an access request sent by user equipment, where the access request includes identification information of the user equipment; and then verifying, by the network authentication network element, whether some or all of the identification information is valid, and if some or all of the identification information is valid, determining, based on the some or all of the identification information that is valid, a slice authentication network element corresponding to the user equipment, and sending the some or all of the identification information to the slice authentication network element corresponding to the user equipment.

According to a sixth aspect, this application provides a network authentication method, applied to a side of a slice authentication network element, where the method includes:

receiving, by the slice authentication network element, identification information of user equipment that is sent by a network authentication network element, generating authentication data for the user equipment based on the identification information, and finally initiating a user authentication request to the user equipment by using the authentication data.

According to a seventh aspect, this application provides a network authentication method, applied to a side of user equipment, where the method includes: sending, by the user equipment, an access request to a network authentication network element, where the access request carries identification information of the user equipment; and receiving, by the user equipment, a user authentication request initiated by the slice authentication network element, and responding to the user authentication request.

By implementing the methods described in the fifth aspect, the sixth aspect, and the seventh aspect, for user equipment that needs to access a network slice, an MNO core network merely needs to first verify validity of the user equipment, and then trigger the network slice to initiate a user authentication request to the user equipment. This greatly improves network slice access efficiency of the user equipment. In addition, because the network needs to verify the validity of the user equipment, control rights of the network on the user equipment are also ensured.

With reference to the fifth aspect, the sixth aspect, or the seventh aspect, in a first possible implementation, the identification information may include at least a first identifier, and the first identifier is network-side identification information of the user equipment.

With reference to the fifth aspect, the sixth aspect, or the seventh aspect, in a second possible implementation, the identification information may include at least a first identifier and a second identifier, the first identifier is network-side identification information of the user equipment, and the second identifier includes at least one of a service identifier and a physical identifier.

With reference to the second possible implementation, in some embodiments, the network authentication network element may send the second identifier (namely, some of the identification information) to the slice authentication network element; and the slice authentication network element may be configured to: generate the authentication data based on the second identifier (namely, some of the identification information), and initiate the user authentication request to the user equipment by using the authentication data.

With reference to the second possible implementation, in some embodiments, the network authentication network element may send the first identifier and the second identifier (namely, all of the identification information) to the slice authentication network element; and the slice authentication network element may be configured to: generate the authentication data based on the first identifier and the second identifier (namely, all of the identification information), and initiate the user authentication request to the user equipment by using the authentication data.

In some embodiments, the user equipment is corresponding to a plurality of network slices. In such a scenario in which the user equipment is corresponding to a plurality of network slices, the user equipment may be enabled to access the plurality of network slices in the following two implementations.

In a first implementation, the slice authentication network element may be further configured to: generate, based on the some or all of the identification information sent by the network authentication network element, authentication data of each of the plurality of network slices for the user equipment, and initiate, to the user equipment, a security authentication request for each of the network slices by using the authentication data of each of the plurality of network slices for the user equipment.

In a second implementation, the network authentication network element may determine, based on the some or all of the identification information that is valid, a slice authentication network element corresponding to each of the plurality of network slices, and send the some or all of the identification information to the slice authentication network element corresponding to each of the plurality of network slices; and the slice authentication network element corresponding to each of the plurality of network slices is configured to: generate authentication data for the user equipment, and initiate a user authentication request to the user equipment by using the authentication data of each of the plurality of network slices for the user equipment.

In some embodiments, before the user equipment sends the access request, the user equipment may further encrypt the identification information by using a first encryption key; a decryption key corresponding to the first encryption key is configured on a side of the network authentication network element; and the network authentication network element is configured to decrypt the encrypted identification information by using the decryption key corresponding to the first encryption key.

In some embodiments, when sending the access request to the network authentication network element, the user equipment may further send, to an access-network network element, access-network-side decodable signaling carrying the identification information and/or access assistance information related to the user equipment; and the access-network-side decodable signaling is used by the access-network network element to perform access control on the access request of the user equipment based on the identification information and/or the access assistance information.

In some embodiments, before the user equipment sends the access-network-side decodable signaling, the user equipment encrypts, by using a second encryption key, the identification information and/or the access assistance information carried in the access-network-side decodable signaling; a decryption key corresponding to the second encryption key is configured on a side of the access-network network element; and the access-network network element is configured to decrypt the encrypted identification information and/or access assistance information by using the decryption key corresponding to the first encryption key.

According to an eighth aspect, this application provides a network authentication device, where the network authentication device includes a transceiver, a processor, and a memory, the memory is configured to store a program and data, and the processor invokes the program in the memory to perform the network authentication method described in any implementation of the fifth aspect.

According to a ninth aspect, this application provides a slice authentication device, where the slice authentication device includes a transceiver, a processor, and a memory, the memory is configured to store a program and data, and the processor invokes the program in the memory to perform the network authentication method described in any implementation of the sixth aspect.

According to a tenth aspect, this application provides user equipment, where the user equipment includes a transceiver, a processor, and a memory, the memory is configured to store a program and data, and the processor invokes the program in the memory to perform the network authentication method described in any implementation of the seventh aspect.

In the technical solutions provided In this disclosure, for user equipment that needs to be access a network slice, an MNO core network first verifies validity of the user equipment, and then the network slice initiates a user authentication request to the user equipment. For an access request of the user equipment, the MNO core network does not need to request a network server (for example, an HSS) to perform calculation and generate authentication data (for example, an authentication vector AV) for the user equipment. This greatly improves network slice access efficiency of the user equipment. In addition, because the network needs to verify the validity of the user equipment, control rights of the network on the user equipment are also ensured.

BRIEF DESCRIPTION OF DRAWINGS

To describe the technical solutions In this disclosure more clearly, the following briefly describes the accompanying drawings required for describing the embodiments.

DESCRIPTION OF EMBODIMENTS

Figure 1:
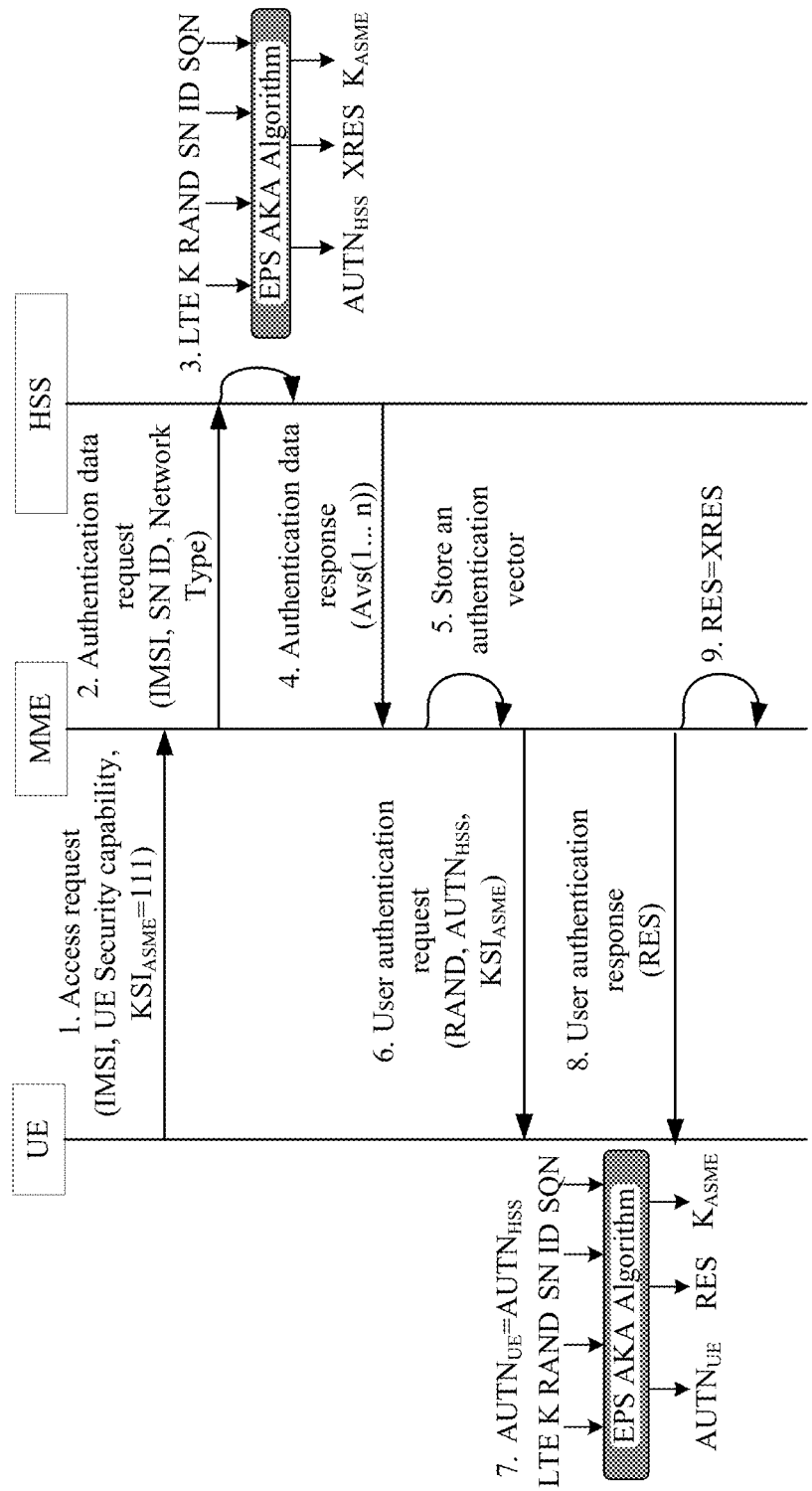
FIG. 1 is a flowchart of existing user authentication based on a pre-shared key related to this application.
Figure 2A:
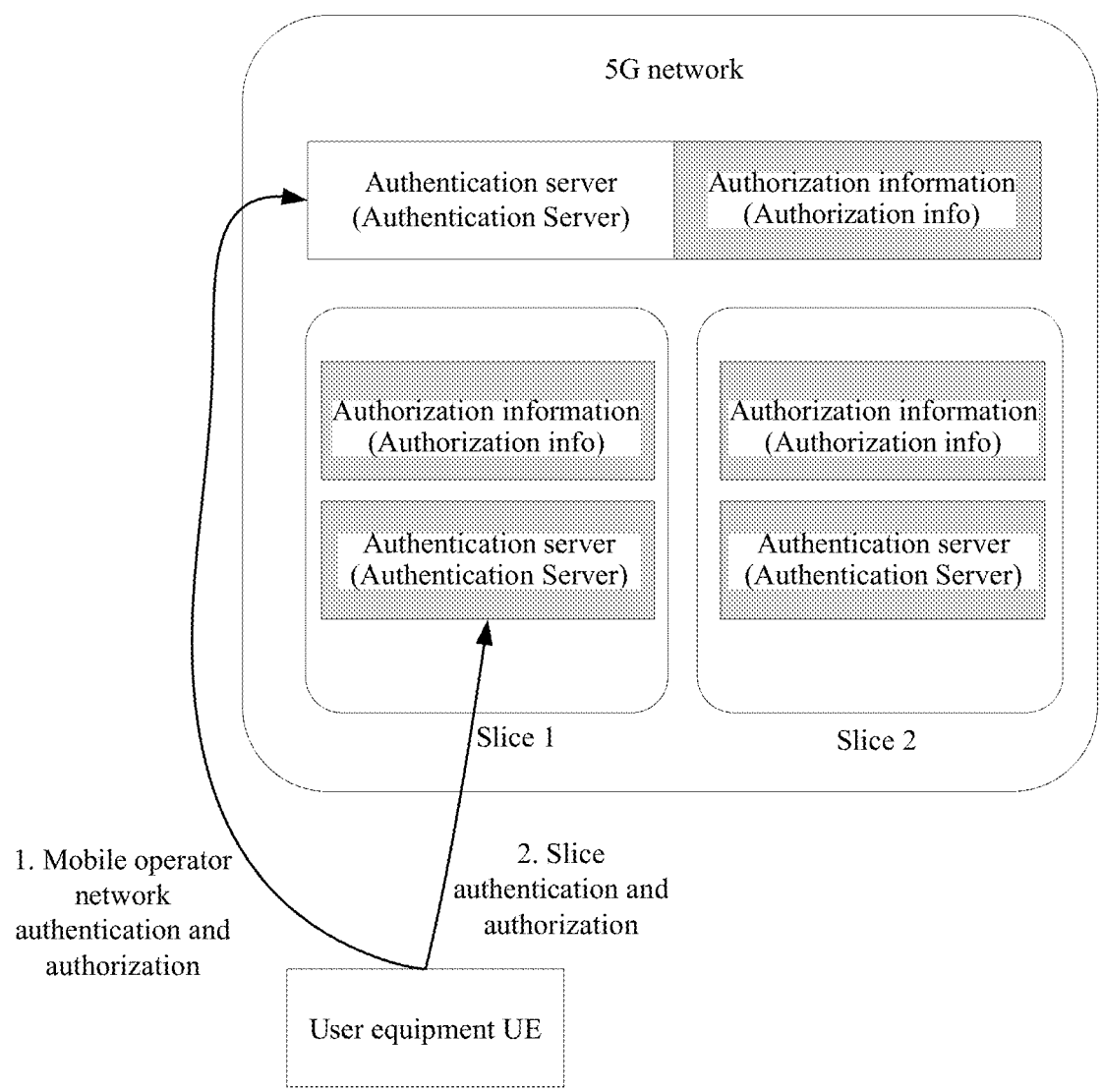
FIG. 2A and FIG. 2B are schematic diagrams of two prior arts about slice authentication related to this application.
Figure 2B:
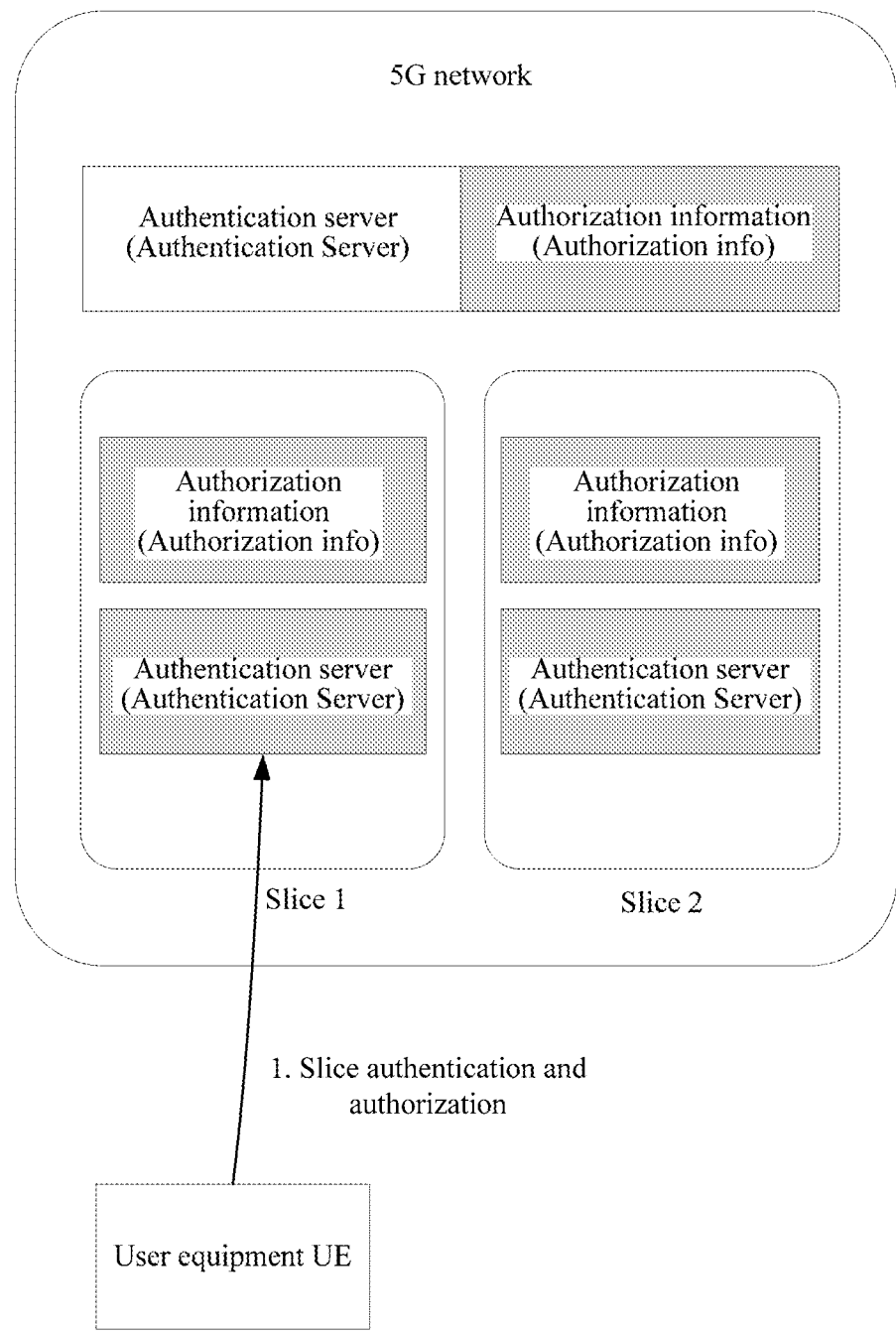

Terms used in an implementation part of this disclosure are merely used to interpret specific embodiments of this application, and are not intended to limit this application.

A network slice is a virtualized logical dedicated network, and may be customized according to different service requirements. To adapt to development of a vertical industry, one or more network slices of an MNO may be leased to the vertical industry, and the vertical industry itself runs, manages, and authenticates user equipment (a mobile terminal, an IoT device, or the like). For user equipment that needs to access a slice, the user equipment first needs to access the slice by using an MNO service, and then the slice manages the user equipment. In other words, the user equipment needs to interact with both an MNO network and the network slice. Existing single MNO network authentication cannot meet operation and management requirements of the vertical industry for services of the vertical industry. The vertical industry needs to customize network attach authentication for the user equipment, and perform custom management and monitoring on a device attached to a network.

To better support customization of a network slice, network elements in an existing MNO network first need to be divided. In a technical report of the 3GPP SA3, it is suggested that an MME and an HSS in a current LTE core network be divided. Currently, a relatively coherent opinion is to divide the MME into functional network elements such as a mobility management function (MMF), a security anchor function (SEAF), and a session management function (SMF), and divide the HSS into functional network elements such as an AUSF (authentication server function) and an ARPF (authentication credential repository and processing function).

The MMF is a control-plane network function, and provides a user with necessary support in intra-network and inter-network movement. For example, the MMF stores a current location and status information of the user.

The SMF is a control-plane network function, and provides various types of signaling support for PDN (Packet Data Network, packet data network) session management, for example, bearer establishment and modification.

The SEAF is a network function used for authentication, and mainly interacts with the AUSF and user equipment. For AKA authentication, the authentication SEAF receives an intermediate key from the AUSF. The SEAF also interacts with the MMF in an access request process.

The AUSF is a network function used for authentication, interacts with the ARPF and the SEAF, is a termination point for receiving request information of the SEAF, and may also be configured in a third-party system.

The ARPF is a network function that stores a long-term security context used for authentication and encryption algorithms, and may also be configured to store security-related user profile.

It should be noted that a division manner of the foregoing functional network elements may change in subsequent formulation of a communications standard, but this change does not affect implementation of this application.

Figure 3:
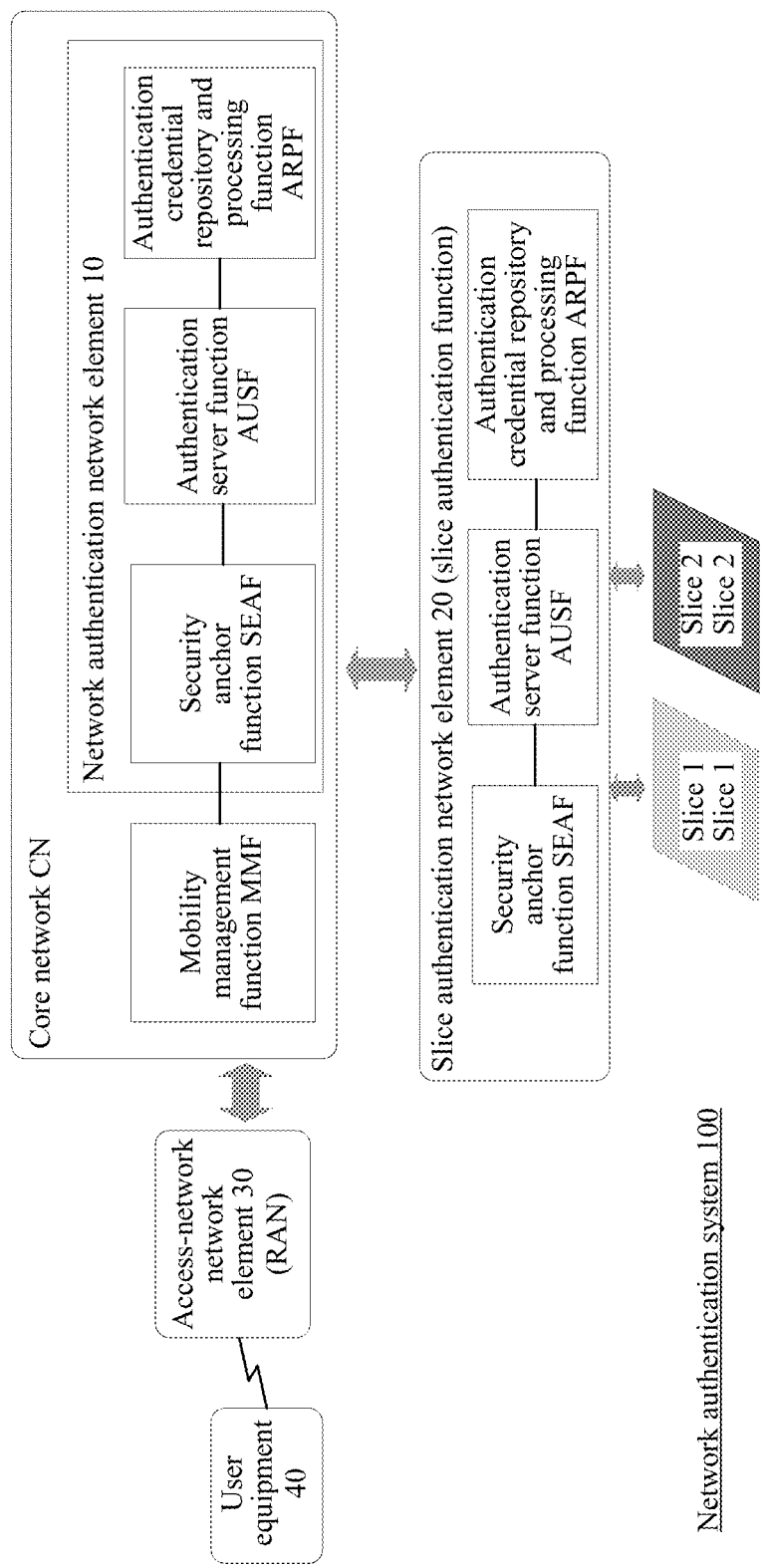
FIG. 3 is a schematic architectural diagram of a network authentication system according to this application.

FIG. 3 is a schematic architectural diagram of a network authentication system according to this application. As shown in FIG. 3, the network authentication system 100 may include user equipment 40, an access-network network element 30, a slice authentication network element 20, and a network authentication network element 10 in a core network.

The access-network network element 30 may be configured to provide a network access service for the user equipment 40. In one implementation, the access-network network element 30 may include a NodeB (NodeB), a base station controller (RNC), an access gateway, or the like. In one implementation, the user equipment 40 may include user terminals such as a mobile phone, a tablet computer, a notebook computer, a mobile Internet device (MID), and a wearable device (such as a smartwatch, a smart band, or a pedometer); or may include an IoT device; or may include another communications device that can access an MNO network.

The network authentication network element 10 may be configured to provide a network authentication service for all UEs that access a network, and may, in some embodiments, include network functions configured in the core network CN, such as a SEAF, an AUSF, and an ARPF.

In this implementation, the network authentication network element 10 does not need to generate an authentication vector AV and initiate a user authentication request to the user equipment 40 by using the authentication vector, but merely needs to determine whether identification information (such as an IMSI) of the user equipment is valid. If the identification information is valid, the network authentication network element 10 needs to query for an address of a slice authentication network element corresponding to the user equipment or an address of an authentication network function, such as a slice authentication anchor (SEAF for Slice) or a slice authentication server (AUSF for Slice), in the slice authentication network element, and trigger the slice authentication network element to perform slice authentication on the user equipment. In other words, in the network authentication network element, the SEAF does not need to send an authentication data request (Authentication Data Request) to the AUSF or the ARPF. In addition, the slice authentication network element does not need to send an authentication data request (Authentication Data Request) to an AUSF, an ARPF, or a network server (such as an HSS) either; and the ARPF or the network server (such as an HSS) does not need to calculate or generate an authentication vector. This can avoid low-efficiency MNO network authentication, and can also ensure network attach control of the MNO network on the user equipment through validity verification, thereby greatly reducing an authentication time for the user equipment to access a slice and improving authentication efficiency.

Herein, validity of the user equipment may include but is not limited to the following cases: (1) The identification information of the user equipment is not deregistered in the network (the ARPF or the HSS), and the network allows a user corresponding to the user equipment to use a service provided by the network. (2) The user equipment is allowed to access a slice, and a user corresponding to the user equipment is a subscriber (not deregistered) of the slice. (3) The user equipment is allowed to access a slice, and a user corresponding to the user equipment is not a subscriber of the slice, but the slice is accessible to a new user who has not subscribed.

The slice authentication network element 20 may be configured to provide a slice authentication service for UE that accesses a slice, and may in some embodiments include slice network functions specially serving a slice, such as a SEAF, an AUSF, and an ARPF. In one implementation, these slice network functions may be configured in the core network or a network slice. Network entities in which these slice network functions are configured are not limited In this disclosure.

It should be noted that the network functions (such as the SEAF, the AUSF, and the ARPF) included in the network authentication network element 10 or the slice authentication network element 20 shown in FIG. 3 are names appearing in a current draft and technical report (TR) of the 3GPP SA3 standard organization. These names may change, for example, renaming, or network function combination or splitting. The present disclosure is not limited to names of these network functions, and network elements in which these network functions are configured. This disclosure is also applicable to other network elements that implement similar functions. For example, the SEAF in the slice authentication network element 20 in FIG. 3 may not exist, and the SEAF in the network authentication network element 10 directly interacts with the AUSF in the slice authentication network element 20. For another example, an MMF in the core network in FIG. 3 may not belong to the network authentication network element 10, and the MMF may be an independent network element, or is configured in another network element. For still another example, in a 4G network, the MMF and the SEAF are configured in a single network element: an MME; and the AUSF and the ARPF are implemented by the HSS.

In one implementation, the network authentication system 100 may include a plurality of slice authentication network elements 20. One slice authentication network element 20 is responsible for providing a slice authentication service for one network slice. In actual application, a plurality of network slices in the network authentication system 100 may also share one slice authentication network element 20. The one slice authentication network element 20 may provide a slice authentication service for each of the plurality of network slices.

It should be understood that, when the access-network network element 30 includes only one network entity (for example, a base station), all subsequently described operations that are performed by the access-network network element 30 are completed by the one network entity. When the access-network network element 30 includes a plurality of network entities (for example, a base station and a base station controller), all subsequently described operations that are performed by the access-network network element 30 are collaboratively completed by the plurality of network entities.

It should be understood that, when the network authentication network element 10 includes only one network entity (for example, an MME), all subsequently described operations that are performed by the network authentication network element 10 are completed by the one network entity. When the network authentication network element 10 includes a plurality of network entities (for example, an MME and an HSS), all subsequently described operations that are performed by the network authentication network element 10 are collaboratively completed by the plurality of network entities.

It should be understood that, when the slice authentication network element 20 includes only one network entity, all subsequently described operations that are performed by the network authentication network element 20 are completed by the one network entity. When the network authentication network element 20 includes a plurality of network entities, all subsequently described operations that are performed by the network authentication network element 20 are collaboratively completed by the plurality of network entities.

Herein, the being collaboratively completed means that the plurality of network entities each perform some operations, and all data and parameters that are generated by performing the operations may be transmitted between the plurality of network entities as required.

It should be noted that those shown in FIG. 3 are not construed as a limitation, the network authentication network element 10 may include more or fewer network functions, and the slice authentication network element 20 may include more or fewer slice network functions. For example, the slice authentication network element 20 may not have the SEAF, and the SEAF in the network authentication network element 10 may directly interact with the AUSF in the slice authentication network element 20.

Figure 4:
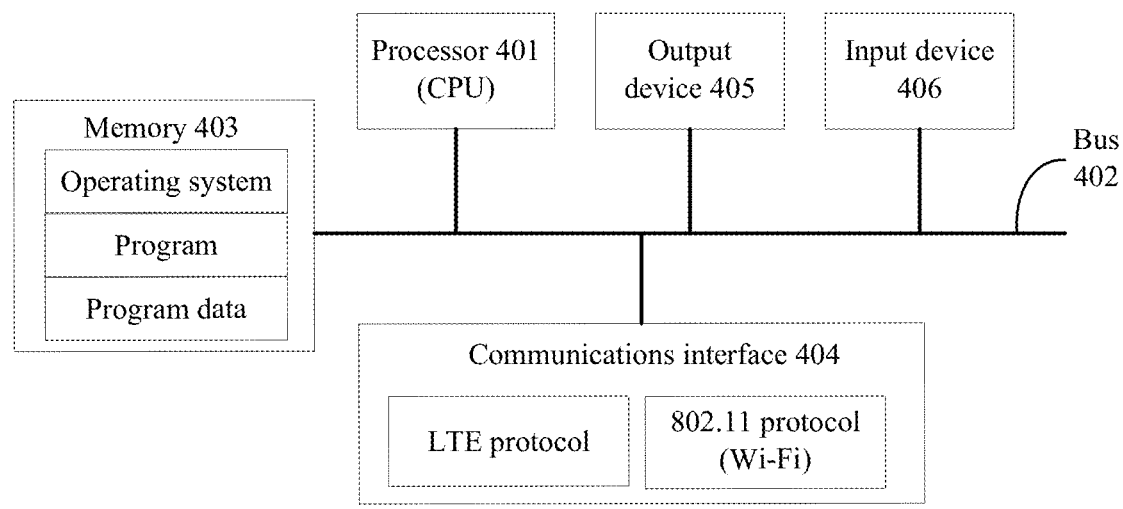
FIG. 4 is a schematic structural diagram corresponding to user equipment, a network authentication device, and a slice authentication device according to this application.

FIG. 4 is a schematic diagram of a communications apparatus according to this application. The user equipment 40, the network authentication network element 10, or the slice authentication network element 20 in FIG. 3 may be implemented by the communications apparatus (or system) 200 shown in FIG. 4.

As shown in FIG. 4, the communications apparatus (or system) 200 may include at least one processor 401, a memory 403, and at least one communications interface 404. These components may communicate with each other on one or more communications buses 402.

It should be noted that FIG. 4 is merely an implementation of this application. In actual application, the communications apparatus 200 may include more or fewer components. No limitation is imposed herein.

The communications interface 404 is configured to receive and send a radio frequency signal, and is coupled to a receiver and a transmitter of the communications apparatus 200. The communications interface 404 communicates, by using a radio frequency signal, with another communications device and a communications network, such as Ethernet (Ethernet), a radio access network (Radio Access Technology, RAN), or a wireless local area network (Wireless Local Area Networks, WLAN). In one implementation, communications protocols supported by the communications interface 404 may include but are not limited to 2G/3G LTE, Wi-Fi, 5G New Radio (NR), and the like.

The memory 403 is coupled with the processor 401, and is configured to store various software programs and/or a plurality of groups of instructions. In one implementation, the memory 403 may include a high-speed random access memory, and may also include a nonvolatile memory, such as one or more magnetic disk storage devices, a flash memory device, or another nonvolatile solid-state storage device. The memory 403 may store an operating system (hereinafter referred to as system), for example, an embedded operating system such as Android, iOS, Windows, or Linux. The memory 403 may be configured to store a program for implementing this application. The memory 403 may further store a network communication program. The network communication program may be used to communicate with one or more auxiliary devices, one or more terminal devices, and one or more network devices.

The processor 401 may be a general-purpose central processing unit (Central Processing Unit, CPU), a microprocessor, an application-specific integrated circuit (Application-Specific Integrated Circuit, ASIC), or one or more integrated circuits configured to control execution of programs of the solutions of this application.

In some embodiments, the communications apparatus 200 may further include an output device 405 and an input device 406. The output device 405 communicates with the processor 401, and may display information in a plurality of manners. For example, the output device 405 may be a liquid crystal display (Liquid Crystal Display, LCD), a light emitting diode (Light Emitting Diode, LED) display device, a cathode ray tube (Cathode Ray Tube, CRT) display device, or a projector (projector). The input device 406 communicates with the processor 401, and may receive a user input in a plurality of manners. For example, the input device 406 may be a mouse, a keyboard, a touchscreen device, or a sensor device. To facilitate use of the output device 405 and the input device 406 by a user, in some embodiments, the memory 403 may further store a user interface program. The user interface program may vividly display content of an application program by using a graphical operation interface, and receive a control operation of a user for the application program by using input controls such as a menu, a dialog box, and a key.

When the communications apparatus 200 shown in FIG. 4 is implemented as the user equipment 40 shown in FIG. 3, the memory of the communications apparatus 200 may store one or more software modules, and may be configured to provide functions such as an access request and a user authentication response. For details, refer to subsequent method embodiments. When the communications apparatus 200 shown in FIG. 4 is implemented as the network authentication network element 10 shown in FIG. 3, the memory of the communications apparatus 200 may store one or more software modules, and may be configured to provide functions such as validity verification for an access user, and slice query. For details, refer to subsequent method embodiments. When the communications apparatus 200 shown in FIG. 4 is implemented as the slice authentication network element 20 shown in FIG. 3, the memory of the communications apparatus 200 may store one or more software modules, and may be configured to provide a function of slice access authentication for one or more slices. For details, refer to subsequent method embodiments.

To enable user equipment to efficiently and securely access a network slice, this application provides a network authentication method. A main principle of this disclosure includes: For user equipment that needs to access a network slice, first, a network (MNO core network) verifies validity of the user equipment; and then the network slice initiates a user authentication request to the user equipment. In this disclosure, the network (MNO core network) does not need to request an HSS to perform calculation and generate authentication data (for example, an authentication vector AV) for the user equipment. This greatly improves network slice access efficiency of the user equipment. In addition, because the network needs to verify the validity of the user equipment, control rights of the network on the user equipment are also ensured.

Figure 5:
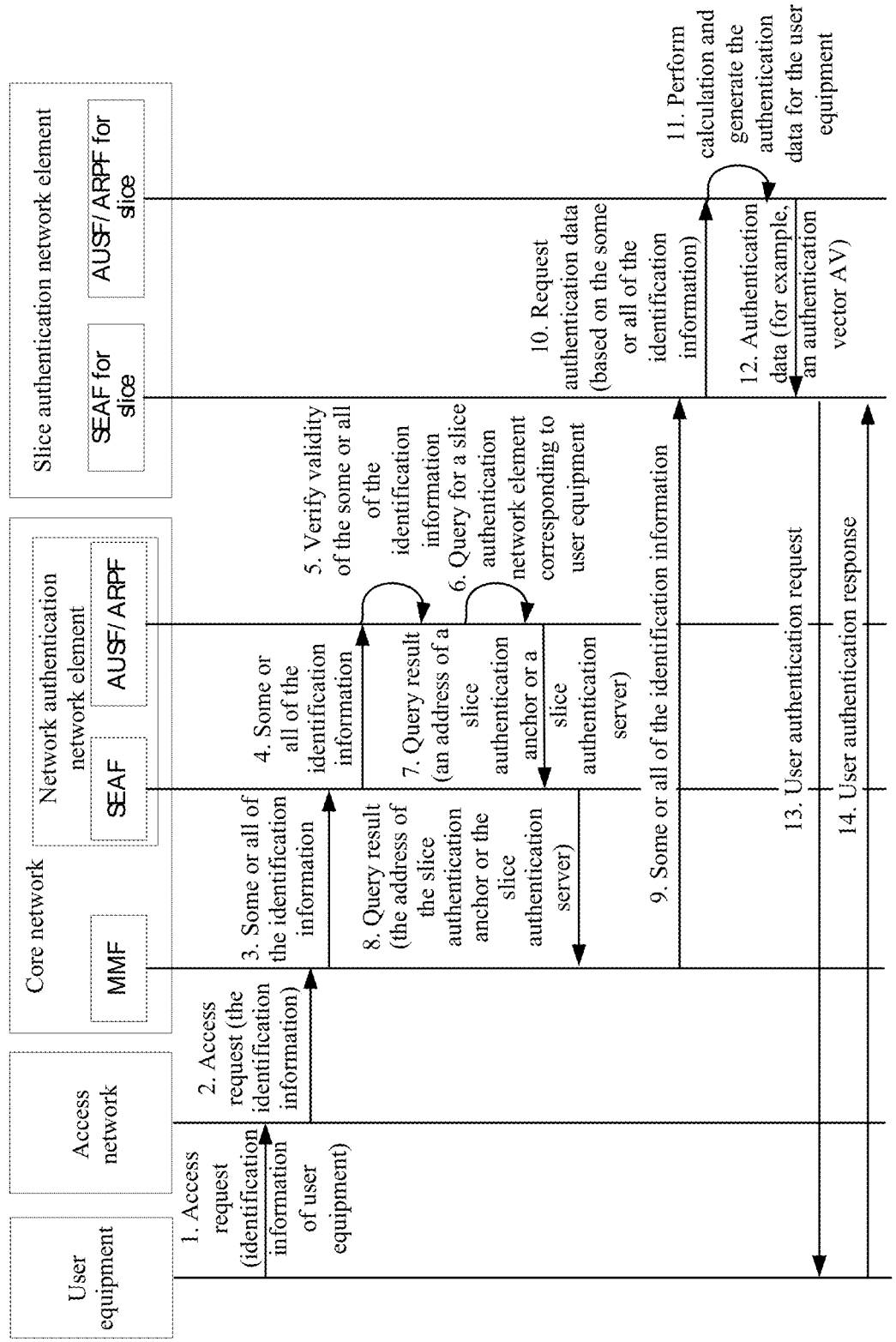
FIG. 5 is an overall schematic flowchart of a network authentication method according to this application.

First, the network authentication method provided In this disclosure is briefly described by using FIG. 5. In this disclosure, a network authentication network element (one or more network entities in a core network CN) may include network functions: a SEAF and an AUSF/ARPF; and a slice authentication network element may include slice authentication functions: a SEAF (namely, SEAF for slice shown in the figure) and an AUSF/ARPF (namely, AUSF/ARPF for slice shown in the figure). It should be noted that a network function, namely, an MMF, in the core network may not be a part of the network authentication network element, for example, may be an independent network element, or is configured in another network element. For details about fine-grained functions included in the network authentication network element and the slice authentication network element, refer to the embodiment of FIG. 3. As shown in FIG. 5, the network authentication method may include the following steps.

Steps 1-2: The user equipment sends an access request to the network authentication network element through an access network, where the access request includes the user identification information.

In this disclosure, the identification information may include a first identifier. The first identifier may be identification information, such as an international mobile subscriber identity (International Mobile Subscriber Identity, IMSI), of the user equipment in the MNO network. Alternatively, the identification information may include the first identifier and the second identifier. The second identifier may be identification information of the user equipment in a network slice. In one implementation, the second identifier may include at least one of a physical identifier (for example, a device identifier), and a service identifier of the user equipment.

In actual application, the identification information carried in the access request may alternatively include more than two identifiers, not limited to the aforementioned first identifier and second identifier.

Steps 3-8: The network authentication network element may verify whether some or all of the identification information is valid, and if some or all of the identification information is valid, determine, based on the some or all of the identification information, a slice authentication network element corresponding to the user equipment.

In one implementation, if the identification information carried in the access request includes only one identifier, for example, the first identifier, the network authentication network element verifies validity by using the first identifier (all of the identification information).

In one implementation, if the identification information carried in the access request includes two identifiers: the first identifier and the second identifier, the network authentication network element may verify validity by using the first identifier (some of the identification information), or may verify validity by using the first identifier and the second identifier (all of the identification information).

Likewise, if the identification information carried in the access request includes more than two identifiers, the network authentication network element may verify validity by using some of the identification information, or may verify validity by using all of the identification information.

In this disclosure, a mapping relationship between the identification information (some or all) and the slice authentication network element corresponding to the user equipment may be configured on a side of the network authentication network element. In this way, on the side of the network authentication network element, the slice authentication network element corresponding to the user equipment may be found through querying based on the identification information (some or all).

Step 9: The network authentication network element sends the some or all of the identification information to the slice authentication network element corresponding to the user equipment.

Similar to that used by the network authentication network element, identification information based on which the slice authentication network element performs user authentication may also be the some or all of the identification information carried in the access request. Therefore, the network authentication network element may send the some or all of the identification information to the slice authentication network element to perform user authentication.

It should be noted that the identification information based on which the slice authentication network element performs user authentication may be completely or partially the same as, or completely different from the identification information based on which the network authentication network element verifies the validity. For details, refer to subsequent specific embodiments.

Steps 10-12: The slice authentication network element corresponding to the user equipment generates authentication data for the user equipment based on the some or all of the identification information sent by the network authentication network element.

Steps 13-14: The slice authentication network element corresponding to the user equipment initiates a user authentication request to the user equipment by using the authentication data for the user equipment, and correspondingly, the user equipment responds to the user authentication request.

It should be noted that a user authentication method used between the slice authentication network element and the user equipment is not limited in this disclosure. In one implementation, an authentication technology based on a symmetric key (similar to a key negotiation mechanism (Authentication and Key Agreement, AKA)) may be used; or user authentication based on an asymmetric key, such as a PM (Public Key Infrastructure, public key infrastructure) mechanism or an IBS (Identity Based Signature, identity based signature) mechanism, may be used.

In some embodiments, the authentication data varies depending on different authentication technologies. For example, if the AKA authentication technology is used, the authentication data may include a random number RAND, an authentication token AUTN_UE, an expected authentication response XRES, K_ASME, a slice identification key, and the like. It should be noted that, to generate the authentication data, both a network slice and the user equipment need to preset a root key corresponding to the identification information of the user equipment. If the PKI or IBS authentication technology is used, the authentication data may include a random number RAND, a digital signature, the identification information (some or all), a slice identifier, and the like. Similarly, to generate the authentication data, both a network slice and the user equipment need to preset a root key, a private key, or a digital certificate corresponding to the identification information of the user equipment. The slice identifier and the identification information together may be used to indicate that the authentication data is authentication data generated for the user equipment by a slice represented by the slice identifier. It should be noted that content included in the identification information may vary in embodiments corresponding to FIG. 6 to FIG. 13A and FIG. 13B.

The authentication data in this disclosure is general and nonspecific authentication data, is applicable to an authentication vector AV defined in the AKA authentication mechanism, and is also applicable to data used for user authentication in the PKI or IBS authentication mechanism.

The following describes in detail the network authentication method provided in this disclosure with reference to the embodiments of FIG. 6 to FIG. 13A and FIG. 13B.

Figure 6:
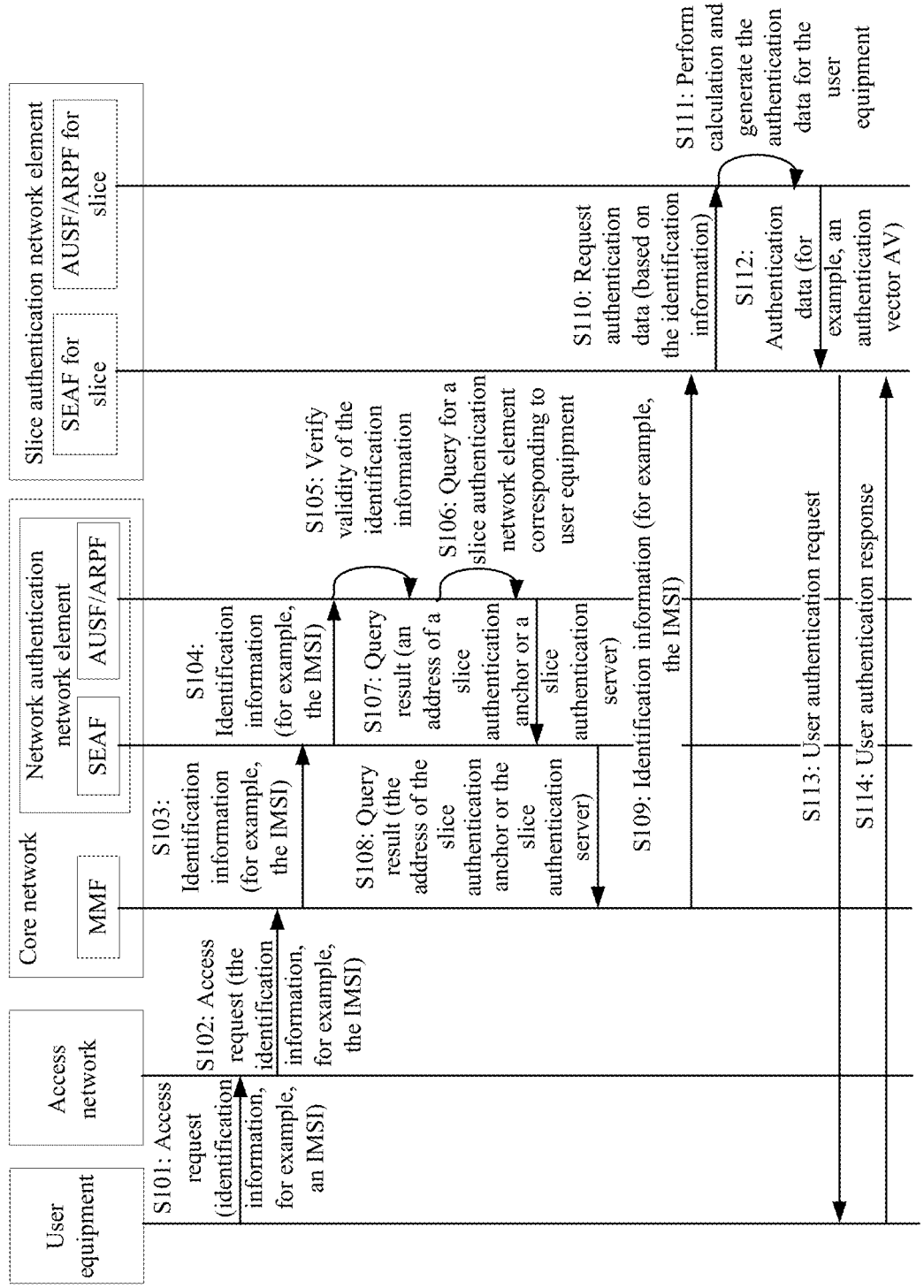
FIG. 6 is a schematic flowchart of a first embodiment of a network authentication method according to this application.

FIG. 6 is a schematic flowchart of a first embodiment of a network authentication method according to this disclosure. In the embodiment of FIG. 6, identification information sent by user equipment is a single identifier. Identification information used by the network authentication network element to verify validity of the user equipment is the same as identification information used by the slice authentication network element to authenticate the user equipment. Descriptions are provided below.

S101-S102: The user equipment sends an access request to the network authentication network element, where the access request includes the identification information of the user equipment. Herein, the identification information may be identification information (for example, an IMSI) of the user equipment in an MNO network, namely, the first identifier.

In some embodiments, the user equipment sends the access request to an access network. Refer to S101. Then the access network may forward the access request to a network access anchor (for example, an MMF configured in a core network, where it should be noted that the MMF may be configured in another network element different from the network authentication network element, or may be an independent network element). For details, refer to S102.

S103-S108: Correspondingly, the network authentication network element receives the access request. Then the network authentication network element may verify whether the identification information is valid, and if the identification information is valid, determine, based on the identification information, a slice authentication network element corresponding to the user equipment.

In one implementation, a database used to store a mapping relationship between the identification information of the user equipment and the slice authentication network element may be configured on a side of the network authentication network element. In the database, the identification information of the user equipment may be corresponding to address information of the slice authentication network element.

In some embodiments, as shown in FIG. 6, S103-S108 may include the following steps.

S103: A network access anchor (MMF) receives the access request forwarded by an access network, extracts the identification information from the access request, and sends the identification information to a network authentication anchor (for example, a SEAF configured in the network authentication network element).

S104: The network authentication anchor may forward the identification information to a network authentication server (for example, an AUSF/ARPF configured in the network authentication network element).

S105: After receiving the identification information, the network authentication server (AUSF/ARPF) may verify whether the identification information is valid.

S106: If the identification information is valid, the network authentication server (AUSF/ARPF) may query, based on the identification information, for a slice authentication anchor or a slice authentication server corresponding to the user equipment.

S107-S108: The network authentication server (AUSF/ARPF) may forward a query result to the network access anchor (MMF) by using the network authentication anchor (SEAF).

In some embodiments, the query result may include an address of the slice authentication anchor or the slice authentication server corresponding to the user equipment. In this way, the network access anchor (MMF) may send, based on the address, the identification information to the slice authentication anchor or the slice authentication server corresponding to the user equipment, to trigger the slice authentication network element to initiate a user authentication request to the user equipment. In this disclosure, the address of the slice authentication anchor or the slice authentication server corresponding to the user equipment may be generally referred to as an address of the slice authentication network element corresponding to the user equipment.

S109: The network authentication network element sends the identification information to the slice authentication network element corresponding to the user equipment.

In some embodiments, the network access anchor (MMF) sends, based on the address of the slice authentication anchor or the slice authentication server corresponding to the user equipment, the identification information to the slice authentication anchor (SEAF for slice) corresponding to the user equipment.

S110-S112: The slice authentication network element corresponding to the user equipment generates authentication data for the user equipment based on the identification information.

In some embodiments, as shown in FIG. 6, S110-S112 may include the following steps.

S110: The slice authentication anchor (SEAF for slice) requests, based on the identification information, to obtain the authentication data from the slice authentication server (AUSF/ARPF for slice).

S111: The slice authentication server (AUSF/ARPF for slice) performs calculation based on the identification information and generates the authentication data for the user equipment, for example, an authentication vector AV defined in the AKA.

S112: The slice authentication server (AUSF/ARPF for slice) returns the authentication data for the user equipment to the slice authentication anchor (SEAF for slice).

S113: The slice authentication network element corresponding to the user equipment initiates a user authentication request to the user equipment by using the authentication data for the user equipment.

In some embodiments, the slice authentication anchor (SEAF for slice) initiates the user authentication request to the user equipment by using the authentication data for the user equipment. Optionally, the authentication request may alternatively be forwarded to the access network by another network element (for example, the network access anchor MMF) in the network and then sent to the user equipment.

S114: The user equipment responds to the user authentication request.

Figure 7:
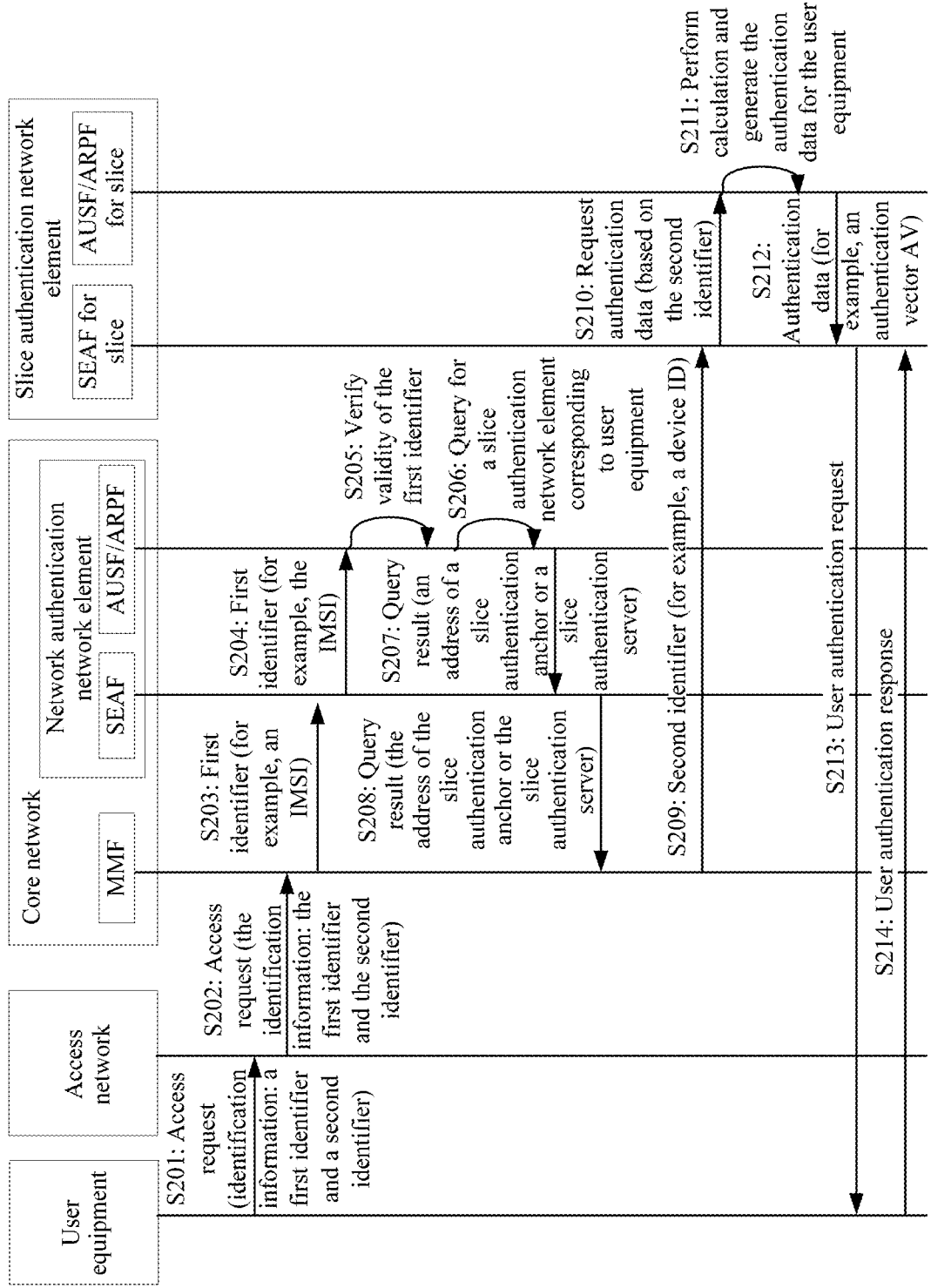
FIG. 7 is a schematic flowchart of a second embodiment of a network authentication method according to this application.

FIG. 7 is a schematic flowchart of a second embodiment of a network authentication method according to this disclosure. In the embodiment of FIG. 7, identification information sent by user equipment includes two identifiers: the first identifier and the second identifier. The network authentication network element verifies validity of the user equipment based on the first identifier, and the slice authentication network element authenticates the user equipment based on the second identifier. Descriptions are provided below.

S201-S202: The user equipment sends an access request to the network authentication network element, where the access request includes the identification information of the user equipment.

For details about S201-S202 and implementations of internal network functions, refer to S101-S102 in the embodiment of FIG. 6.

A difference from the embodiment of FIG. 6 is that the identification information may include the first identifier and the second identifier. The second identifier may be a physical identifier (for example, a device ID), or may be a service identifier. It should be understood that using a physical identifier as the second identifier is more suitable for a scenario in which a vertical industry sets a fixed device ID for a device in the vertical industry.

S203-S208: Correspondingly, the network authentication network element receives the access request. Then the network authentication network element may verify whether the first identifier is valid, and if the first identifier is valid, determine, based on the first identifier, the slice authentication network element corresponding to the user equipment.

For details about S203-S208 and implementations of internal network functions, refer to S103-S108 in the embodiment of FIG. 6.

S209: The network authentication network element sends the second identifier to the slice authentication network element corresponding to the user equipment.

In some embodiments, after completing verifying the validity of the user equipment by using a network server AUSF/ARPF, and obtaining, through querying, an address of a slice access anchor or a slice authentication server corresponding to the user equipment, a network access anchor (MMF) sends the second identifier to the slice access anchor (SEAF for slice).

S210-S212: The slice authentication network element corresponding to the user equipment generates authentication data for the user equipment based on the second identifier.

In some embodiments, as shown in FIG. 7, S210-S212 may include the following steps.

S210: A slice authentication anchor (SEAF for slice) requests, based on the second identifier, to obtain the authentication data from a slice authentication server (AUSF/ARPF for slice).

S211: The slice authentication server (AUSF/ARPF for slice) performs calculation based on the second identifier and generates the authentication data for the user equipment.

S212: The slice authentication server (AUSF/ARPF for slice) returns the authentication data for the user equipment to the slice authentication anchor (SEAF for slice).

A difference from the embodiment of FIG. 6 is that the slice authentication network element needs to generate the authentication data for the user equipment by using the second identifier, and initiate a user authentication request to the user equipment by using the authentication data.

It may be understood that skipping sending the first identifier (for example, an IMSI) to the slice authentication network element can avoid exposing the identification information (for example, the IMSI) of the user equipment in an MNO network to a slice operator, can also avoid disclosing a relationship between the IMSI of the user equipment and the device ID, and can prevent a potential security attack against the IMSI and the device ID.

S213: The slice authentication network element corresponding to the user equipment initiates a user authentication request to the user equipment by using the authentication data for the user equipment.

S214: The user equipment responds to the user authentication request.

Figure 8A:
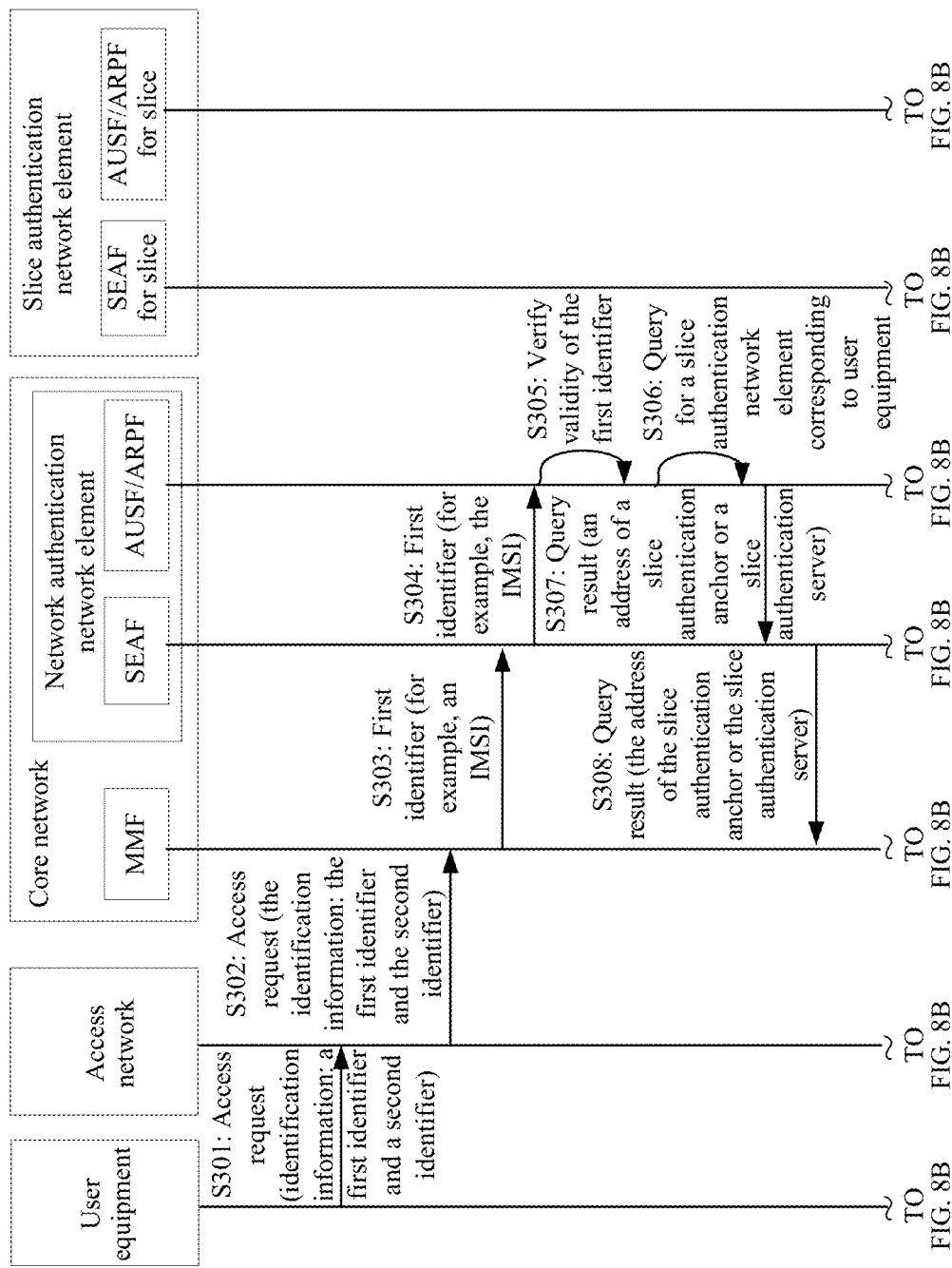
FIG. 8A and FIG. 8B is a schematic flowchart of a third embodiment of a network authentication method according to this application.
Figure 8B:
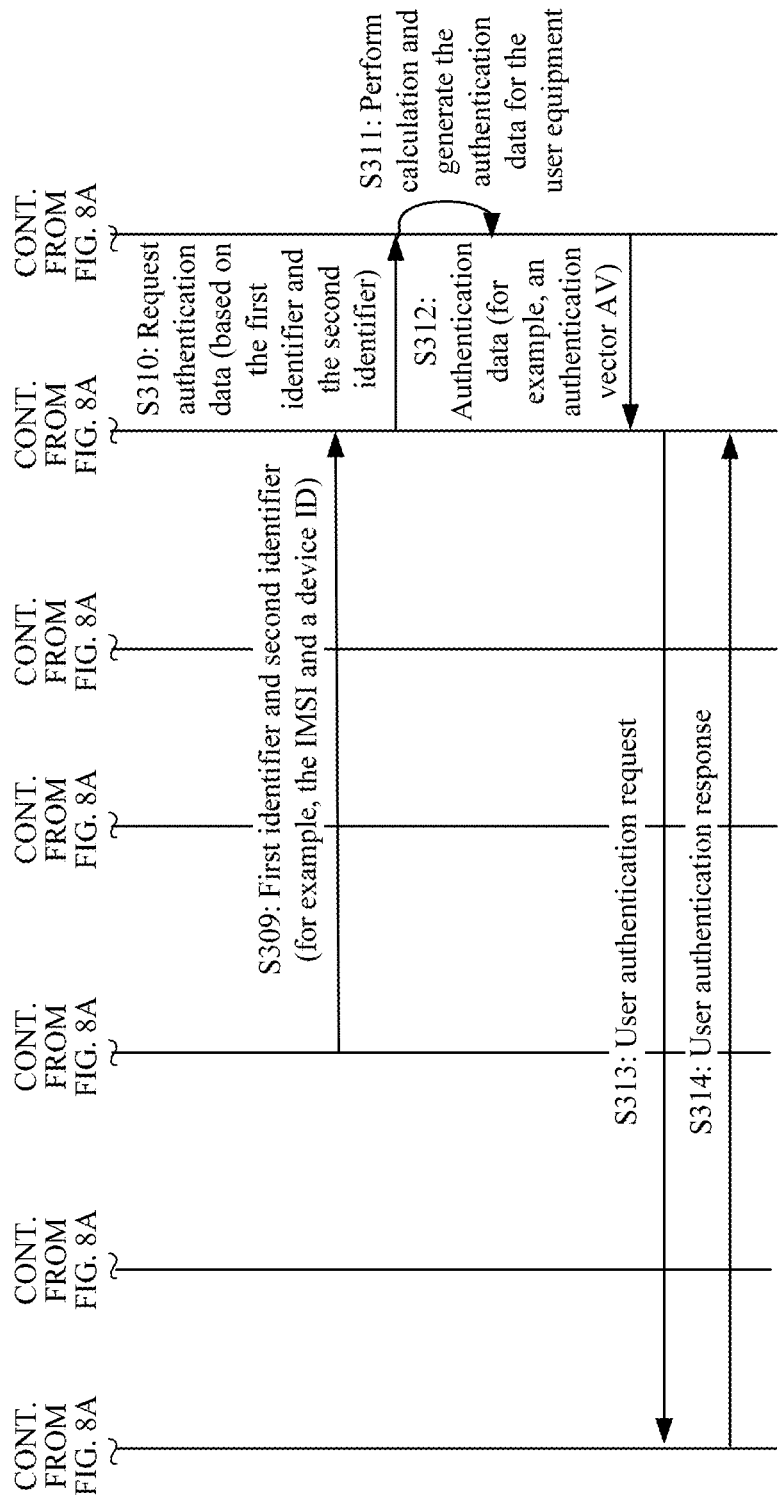

FIG. 8A and FIG. 8B is a schematic flowchart of a third embodiment of a network authentication method according to this application. In the embodiment of FIG. 8A and FIG. 8B, identification information sent by user equipment includes two identifiers: the first identifier and the second identifier. The network authentication network element verifies validity of the user equipment based on the first identifier, and the slice authentication network element authenticates the user equipment based on the first identifier and the second identifier. Descriptions are provided below.

S301-S302: The user equipment sends an access request to the network authentication network element, where the access request includes the identification information of the user equipment.

For details about S301-S302 and implementations of internal network functions, refer to S101-S102 in the embodiment of FIG. 6.

A difference from the embodiment of FIG. 6 is that the identification information may include the first identifier and the second identifier. The second identifier may be a physical identifier (for example, a device ID), or may be a service identifier. It should be understood that using a physical identifier as the second identifier is more suitable for a scenario in which a vertical industry sets a fixed device ID for a device in the vertical industry.

S303-S308: Correspondingly, the network authentication network element receives the access request. Then the network authentication network element may verify whether the first identifier is valid, and if the first identifier is valid, determine, based on the first identifier, the slice authentication network element corresponding to the user equipment.

For details about S303-S308 and implementations of internal network functions, refer to S103-S108 in the embodiment of FIG. 6.

S309: The network authentication network element sends the first identifier and the second identifier to the slice authentication network element corresponding to the user equipment.

In some embodiments, after completing verifying the validity of the user equipment by using a network server AUSF/ARPF, and obtaining, through querying, an address of a slice access anchor or a slice authentication server corresponding to the user equipment, a network access anchor (MMF) sends the first identifier and the second identifier to the slice access anchor (SEAF for slice).

S310-S312: The slice authentication network element corresponding to the user equipment generates authentication data for the user equipment based on the first identifier and the second identifier.

In some embodiments, as shown in FIG. 8A and FIG. 8B, S310-S312 may include the following steps.

S310: A slice authentication anchor (SEAF for slice) requests, based on the first identifier and the second identifier, to obtain the authentication data from a slice authentication server (AUSF/ARPF for slice).

S311: The slice authentication server (AUSF/ARPF for slice) performs calculation based on the first identifier and the second identifier and generates the authentication data for the user equipment.

S312: The slice authentication server (AUSF/ARPF for slice) returns the authentication data for the user equipment to the slice authentication anchor (SEAF for slice).

A difference from the embodiment of FIG. 6 is that the slice authentication network element needs to generate the authentication data for the user equipment by using the first identifier and the second identifier, and initiate a user authentication request to the user equipment by using the authentication data.

As described in the embodiment of FIG. 7, if the IMSI and the device ID are simultaneously sent to the slice authentication anchor, association between the IMSI and the device ID may be exposed to a slice. However, in some application scenarios (for example, a slice operator is subordinate to an MNO or has a strong trust relationship with an MNO, and a slice needs to provide some network services for a user), a slice needs to know the association between the IMSI and the device ID, so as to better provide a network service for a user.

S313: The slice authentication network element corresponding to the user equipment initiates a user authentication request to the user equipment by using the authentication data for the user equipment.

S314: The user equipment responds to the user authentication request.

Figure 9A:
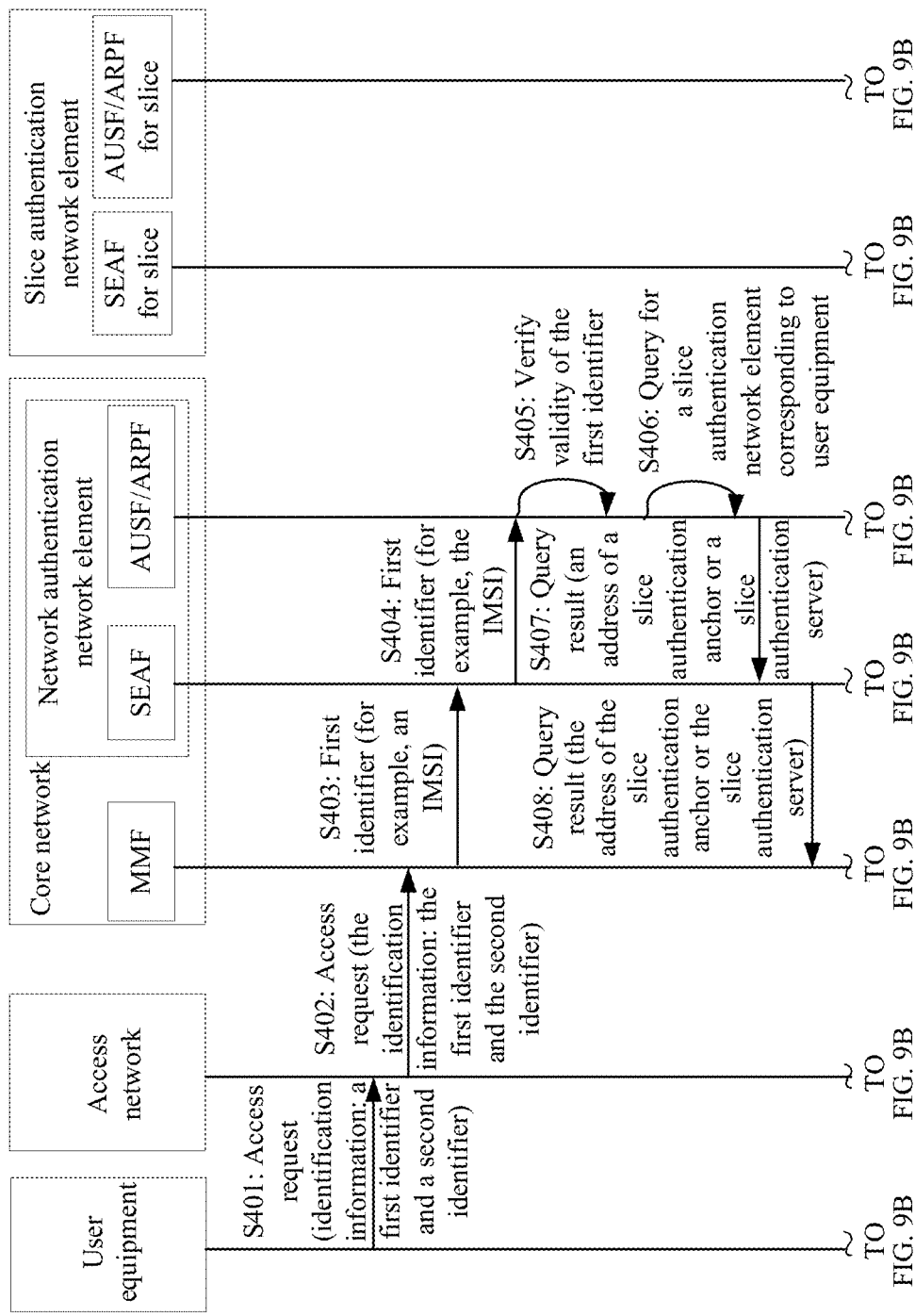
FIG. 9A and FIG. 9B is a schematic flowchart of a fourth embodiment of a network authentication method according to this application.
Figure 9B:
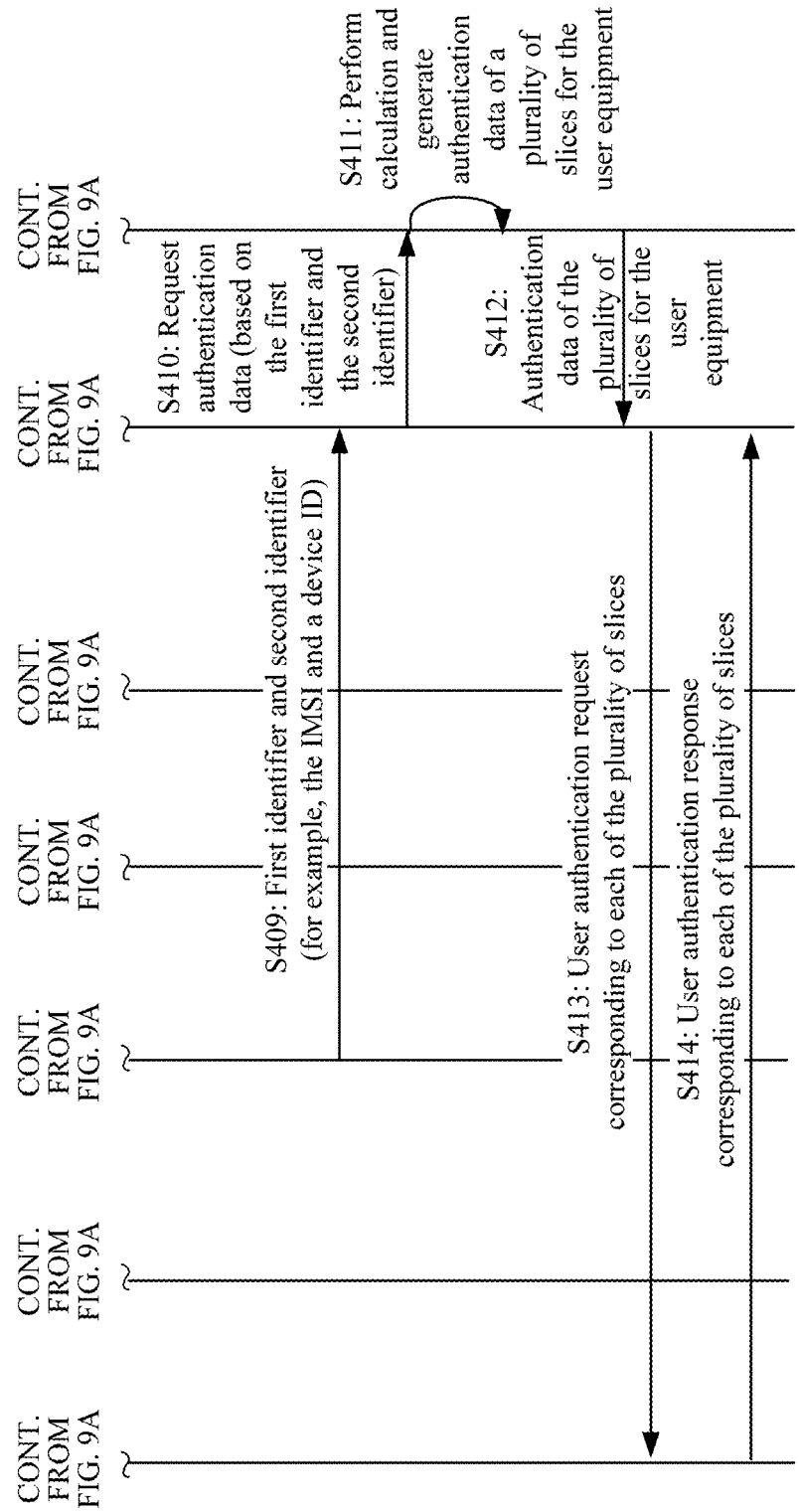

FIG. 9A and FIG. 9B is a schematic flowchart of a fourth embodiment of a network authentication method according to this application. In the embodiment of FIG. 9A and FIG. 9B, an MNO network supports a scenario of a plurality of network slices. In the application scenario of a plurality of network slices, one user equipment may simultaneously access a plurality of different network slices. For example, an in-vehicle terminal may simultaneously access a high-bandwidth slice and an Internet of Vehicles slice. In the embodiment of FIG. 9A and FIG. 9B, user equipment corresponds to a plurality of different network slices. The plurality of slices share a slice authentication network element. The slice authentication network element may be configured to provide a user authentication service for each of the plurality of slices. Descriptions are provided below.

S401-S402: The user equipment sends an access request to the network authentication network element, where the access request includes identification information of the user equipment.

It should be noted that, in the embodiment of FIG. 9A and FIG. 9B, as shown in the figure, the identification information includes the first identifier and the second identifier; however, this should not be construed as a limitation—the identification information may include only the first identifier in some other embodiments. Refer to the embodiment of FIG. 6.

S403-S408: Correspondingly, the network authentication network element receives the access request. Then the network authentication network element may verify whether the first identifier is valid, and if the first identifier is valid, determine, based on the first identifier, the slice authentication network element corresponding to the user equipment.

For details about S403-S408 and implementations of internal network functions, refer to S103-S108 in the embodiment of FIG. 6.

A difference from the embodiment of FIG. 6 is that the slice authentication network element (slice authentication anchor and slice authentication server) corresponding to the user equipment may be configured to provide the user authentication service for the plurality of slices. In one implementation, an authentication policy corresponding to each of all slices supported by an MNO may be configured on a side of the slice authentication network element. Herein, the authentication policy may include an authentication mechanism customized for each slice, for example, an AKA authentication mechanism or a PKI authentication mechanism.

S409: The network authentication network element sends the first identifier and the second identifier to the slice authentication network element corresponding to the user equipment. Optionally, identification information sent by the network authentication network element to the slice authentication network element may include only information about the first identifier. Refer to the embodiment of FIG. 6. In some embodiments, identification information sent by the network authentication network element to the slice authentication network element may include only information about the second identifier. Refer to the embodiment of FIG. 7.

For details about S409 and implementations of internal network functions, refer to corresponding steps in the embodiments corresponding to FIG. 6 to FIG. 8A and FIG. 8B.

S410-S412: The slice authentication network element corresponding to the user equipment generates authentication data for the user equipment based on the first identifier and the second identifier. Refer to S310-S312 in the embodiment of FIG. 8A and FIG. 8B. Optionally, the slice authentication network element may generate authentication data for the user equipment based only on the information about the first identifier. Refer to S110-S112 in the embodiment of FIG. 6. Optionally, the slice authentication network element may generate authentication data for the user equipment based only on the information about the second identifier. Refer to S210-S212 in the embodiment of FIG. 7.

A difference between the embodiments corresponding to FIG. 6 to FIG. 8A and FIG. 8B is that the authentication data generated by the slice authentication network element based on the first identifier and the second identifier, or the first identifier, or the second identifier includes authentication data, for the user equipment, of the plurality of network slices corresponding to the user equipment.

In some embodiments, the difference may be implemented as the following process.

S410: A slice authentication anchor (SEAF for slice) may determine the plurality of slices corresponding to the user equipment based on the first identifier and the second identifier, or the first identifier, or the second identifier. In one implementation, a database may be configured on a side of the slice authentication anchor (SEAF for slice). The database may store slice IDs of all slices supported by an MNO, and the first identifier (IMSI) and/or the second identifier (device ID) of a subscriber corresponding to each of all the slices. In another implementation, in S410, the slice authentication anchor (SEAF for slice) does not need to determine the plurality of slices corresponding to the user equipment, and does not need to configure the database either. This function may be implemented by an authentication server (AUSF/ARPF for slice) in S411.

S411: The slice authentication server (AUSF/ARPF for slice) may generate, based on a user authentication mechanism customized for each of the plurality of network slices, authentication data of each of the plurality of network slices for the user equipment. In addition, the slice authentication server (AUSF/ARPF for slice) returns the authentication data to the slice authentication anchor (SEAF for slice). Refer to S412.

S413: The slice authentication network element corresponding to the user equipment initiates, to the user equipment by using the authentication data of each of the plurality of network slices for the user equipment, a user authentication request corresponding to each of the plurality of network slices.

S414: The user equipment responds to the user authentication request corresponding to each of the plurality of network slices.

Figure 10A:
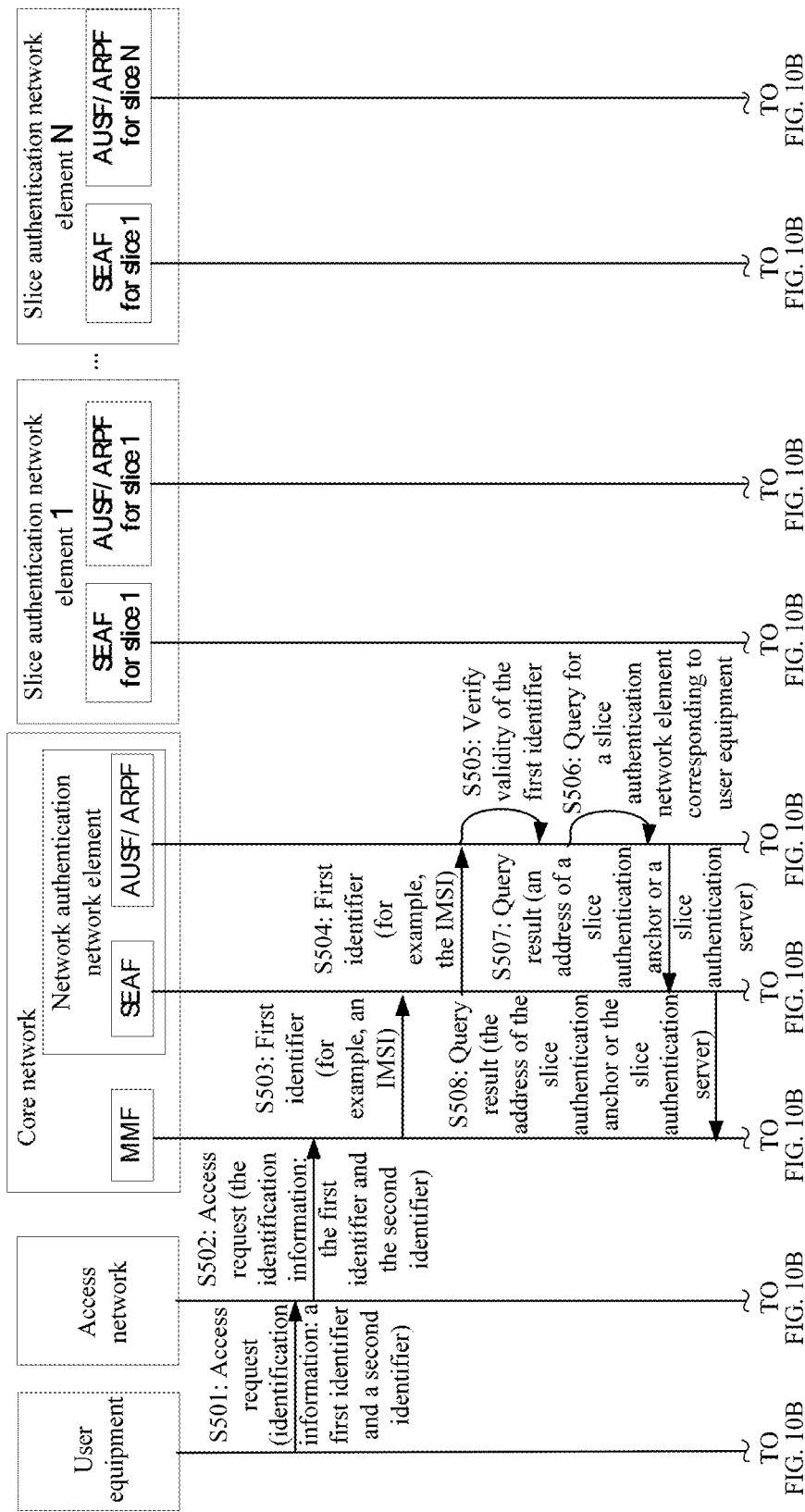
FIG. 10A and FIG. 10B is a schematic flowchart of a fifth embodiment of a network authentication method according to this application.
Figure 10B:
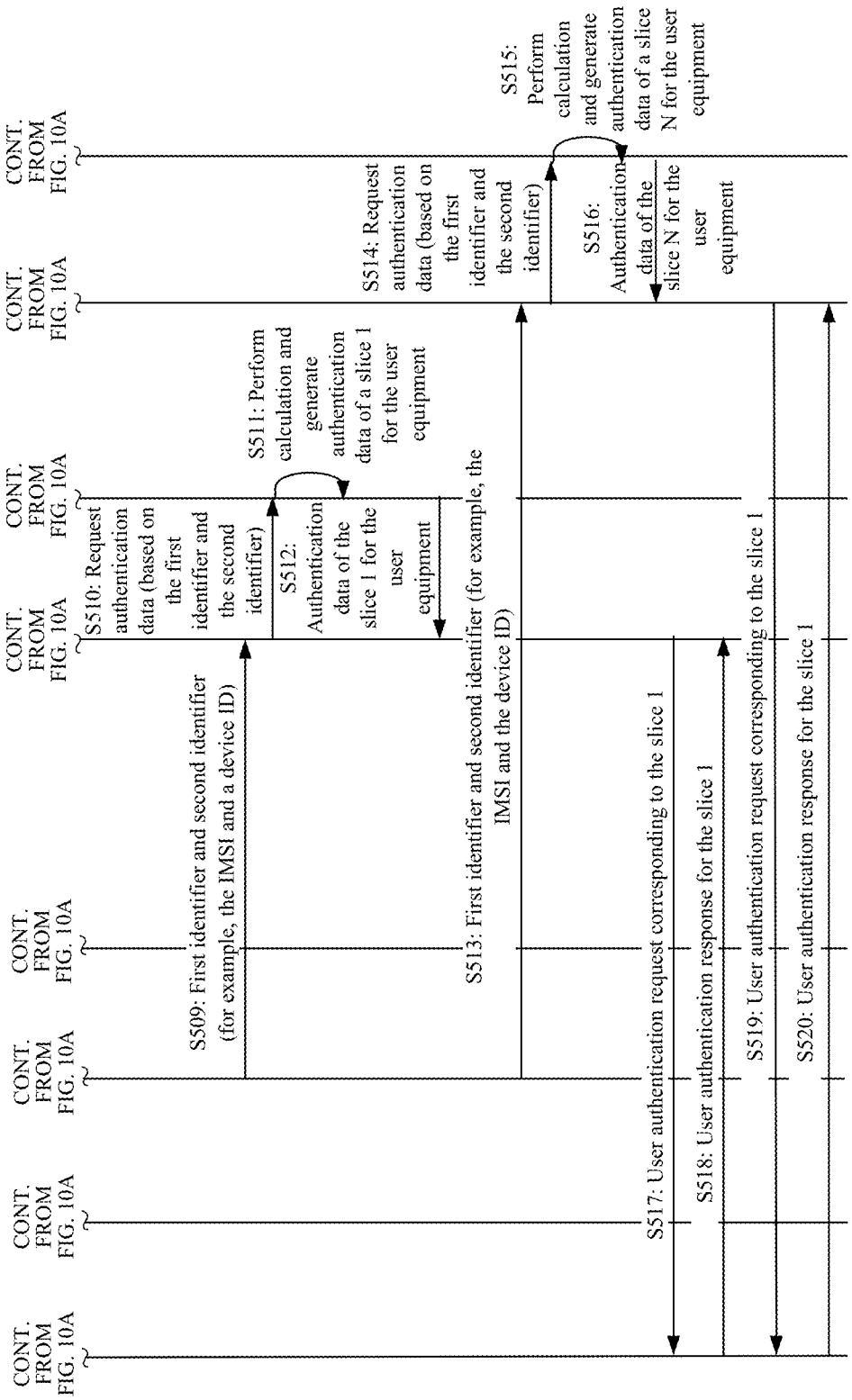

FIG. 10A and FIG. 10B is a schematic flowchart of a fifth embodiment of a network authentication method according to this application. In the embodiment of FIG. 10A and FIG. 10B, an MNO network supports a scenario of a plurality of network slices. In the application scenario of a plurality of network slices, one user equipment may simultaneously access a plurality of different network slices. For example, an in-vehicle terminal may simultaneously access a high-bandwidth slice and an Internet of Vehicles slice. In the embodiment of FIG. 10A and FIG. 10B, user equipment is corresponding to a plurality of different network slices. Each of the plurality of different network slices is corresponding to a slice authentication network element. The slice authentication network element may be configured to specially provide a user authentication service for a corresponding slice. Descriptions are provided below.

S501-S502: The user equipment sends an access request to the network authentication network element, where the access request includes identification information of the user equipment. For details, refer to corresponding steps in the embodiment of FIG. 9A and FIG. 9B. Details are not described herein again.

S503-S508: Correspondingly, the network authentication network element receives the access request. Then the network authentication network element may verify whether the first identifier is valid, and if the first identifier is valid, determine, based on the first identifier, a slice authentication network element corresponding to the user equipment. For details, refer to corresponding steps in the embodiment of FIG. 9A and FIG. 9B. Details are not described herein again.

A difference between the embodiment of FIG. 9A and FIG. 9B is that the user equipment corresponds to a plurality of slice authentication network elements, which may be configured to provide a user authentication service for a slice corresponding to each of the plurality of slice authentication network elements.

In one implementation, a database may be configured on a side of the network authentication network element. The database may store an address of a slice authentication network element corresponding to each of all slices supported by an MNO, and identification information (for example, an IMSI) of a subscriber corresponding to each of all the slices. In some embodiments, after receiving the access request sent by the user equipment, the network authentication network element may further obtain, from the database through querying based on the first identifier carried in the access request, addresses of the plurality of slice authentication network elements corresponding to the user equipment.

In some embodiments, a reflection on an internal network function is: A query result that a network authentication anchor (SEAF) requests to obtain from a network authentication server (AUSF/ARPF) may include addresses of a plurality of slice authentication anchors (SEAF for slice) or addresses of a plurality of slice authentication servers (AUSF/ARPF for slice). Refer to S507. Then the network authentication anchor (SEAF) sends the query result to a network access anchor (MMF). Refer to S508.

S509-S516: The network authentication network element sends the first identifier and the second identifier to a plurality of slice authentication network elements corresponding to the user equipment. Then the plurality of slice authentication network elements may generate, based on the first identifier and the second identifier, authentication data, for the user equipment, of a slice corresponding to each of the plurality of slice authentication network elements.

For an implementation of sending, by the network authentication network element, the first identifier and the second identifier to each slice authentication network element, and an implementation of generating, by each slice authentication network element, authentication data for the user equipment based on the first identifier and the second identifier, refer to corresponding steps in the embodiment of FIG. 8A and FIG. 8B. Details are not described herein again.

In some embodiments, the network authentication network element may alternatively send the first identifier to each of the plurality of slice authentication network elements corresponding to the user equipment. Then the plurality of slice authentication network elements may generate, based on the first identifier, authentication data, for the user equipment, of a slice corresponding to each of the plurality of slice authentication network elements.

For an implementation of sending, by the network authentication network element, the first identifier to each slice authentication network element, and a one implementation of generating, by each slice authentication network element, authentication data for the user equipment based on the first identifier, refer to corresponding steps in the embodiment of FIG. 6.

In some embodiments, the network authentication network element may send the second identifier to each of the plurality of slice authentication network elements corresponding to the user equipment. Then the plurality of slice authentication network elements may generate, based on the second identifier, authentication data, for the user equipment, of a slice corresponding to each of the plurality of slice authentication network elements.

For an implementation of sending, by the network authentication network element, the second identifier to each slice authentication network element, and a one implementation of generating, by each slice authentication network element, authentication data for the user equipment based on the second identifier, refer to corresponding steps in the embodiment of FIG. 6.

S517-S520: Each of the plurality of slice authentication network elements corresponding to the user equipment initiates a user authentication request to the user equipment by using the authentication data of each of the plurality of slice authentication network elements for the user equipment. The user equipment responds to the user authentication request initiated by each of the plurality of slice authentication network elements. For details about a user authentication process of the user equipment and each slice authentication network element corresponding to the user equipment, refer to corresponding steps in the embodiments corresponding to FIG. 6 to FIG. 8A and FIG. 8B. Details are not described herein again.

Figure 11A:
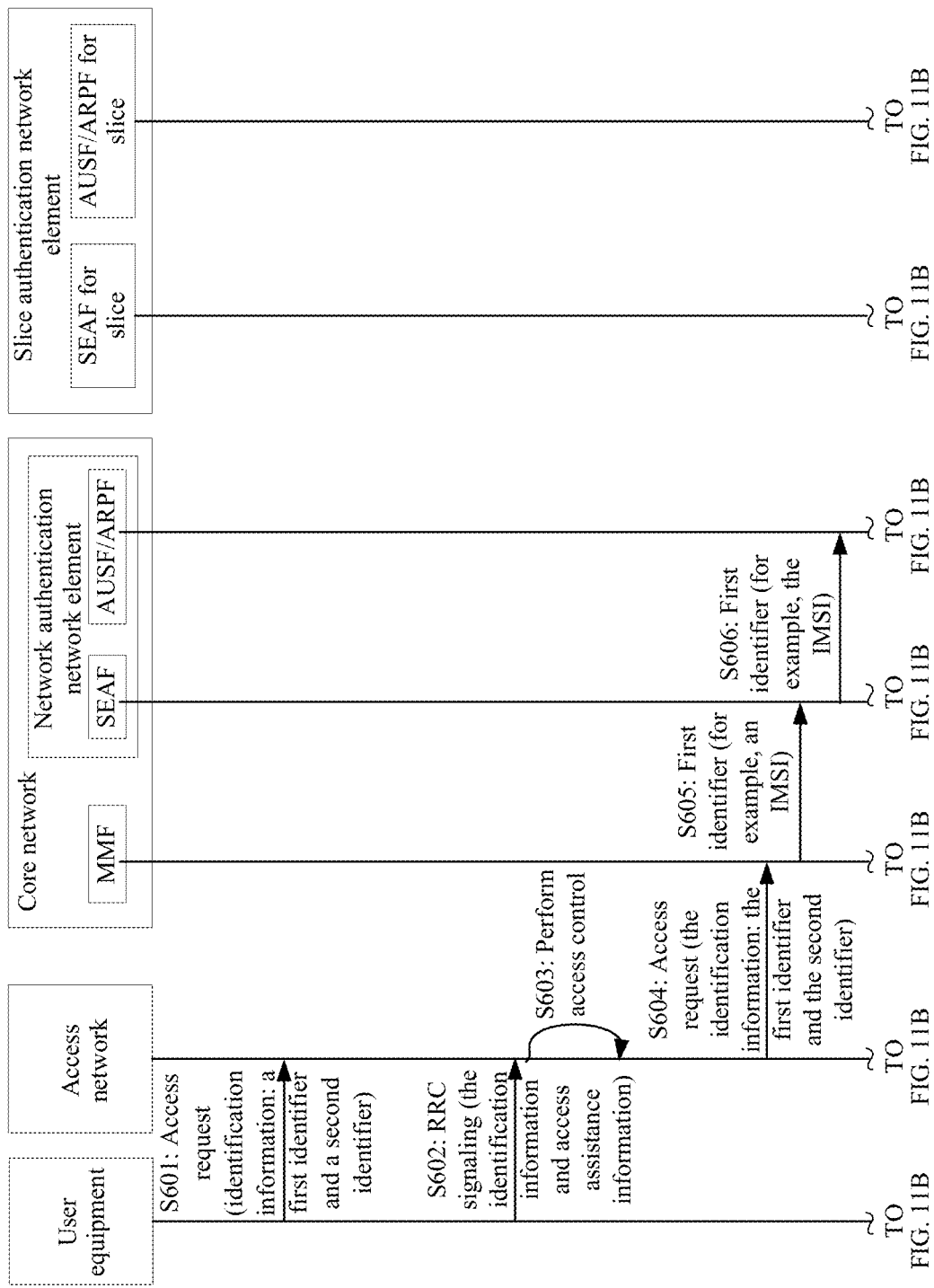
FIG. 11A and FIG. 11B is a schematic flowchart of a sixth embodiment of a network authentication method according to this application.
Figure 11B:
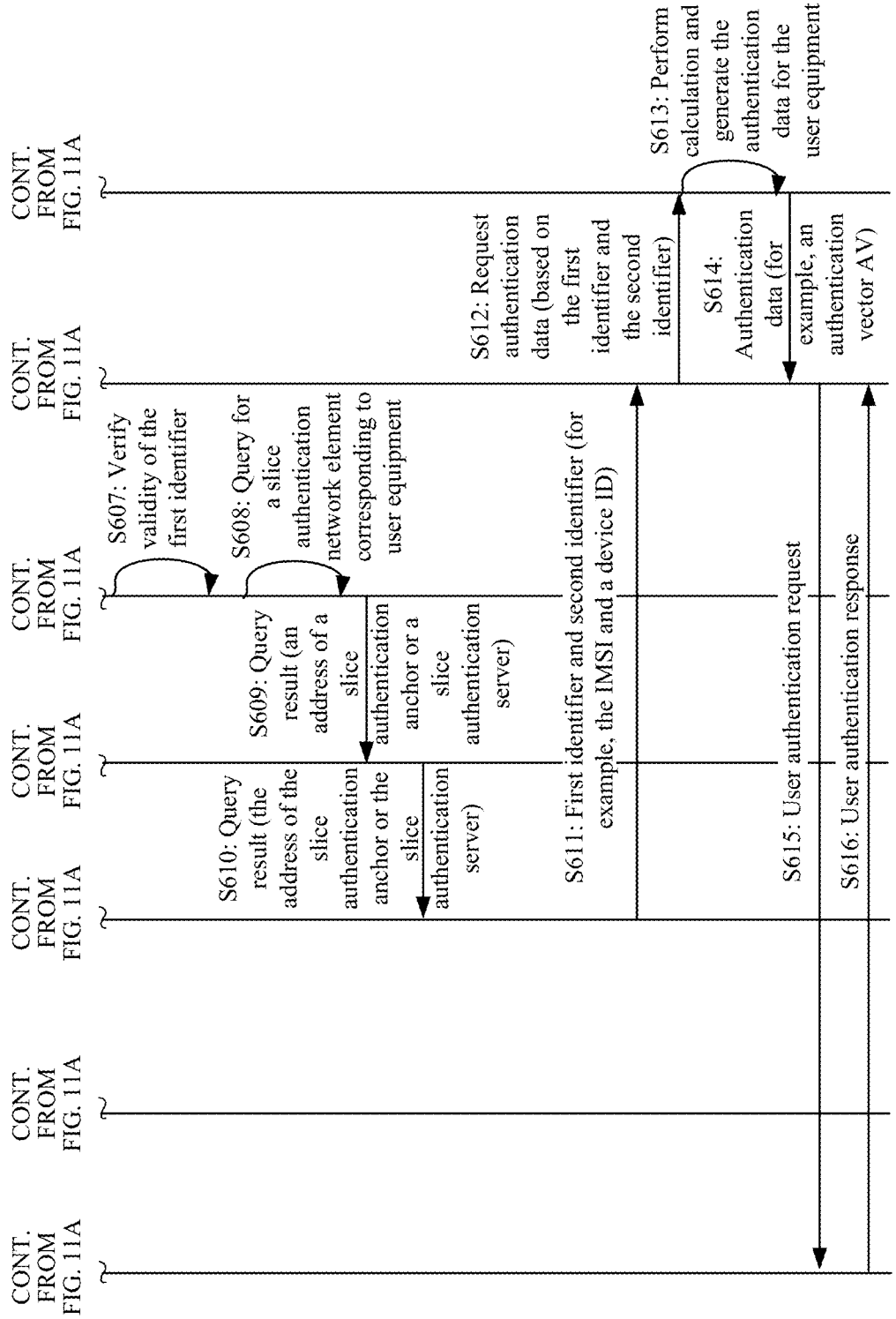

FIG. 11A and FIG. 11B is a schematic flowchart of a sixth embodiment of a network authentication method according to this application. In the embodiment of FIG. 11A and FIG. 11B, when sending the access request (carrying identification information of the user equipment) to the network authentication network element through an access network (RAN), the user equipment may further simultaneously send, by using an access network (RAN)-side decodable signaling channel such as RRC, the identification information (for example, a device ID) of the user equipment, or access assistance information related to the user equipment, such as an access priority. The identification information and/or the access assistance information in the RAN-side decodable signaling may be decoded on a RAN side. This can help the RAN perform access control based on the information. For example, an IoT device does not require a very low latency (has a low priority), and the RAN may delay processing an access request of such a device. For other devices that require a low latency (have a high priority), the RAN may preferentially process access requests of these devices. In this way, the RAN may perform differential processing for the user equipment by using the identification information and/or the access assistance information in the RAN-side decodable signaling. This can optimize access control of the RAN, and is especially beneficial to a simultaneous access scenario of massive user equipments (including an IoT device, an in-vehicle device, a mobile phone, and the like). Descriptions are provided below.

S601-S604: The user equipment sends the access request to an access-network network element, where the access request includes the identification information of the user equipment. When sending the access request, the user equipment may further send, to the access-network network element, the RAN-side decodable signaling carrying the identification information and/or the access assistance information related to the user equipment. The access-network network element performs access control on the access request of the user equipment based on the identification information and/or the access assistance information. Finally, the access-network network element forwards the access request to the network authentication network element.

Herein, the RAN-side decodable signaling may be used by the access-network network element to perform access control on the access request of the user equipment based on the identification information and/or the access assistance information.

It should be noted that, in the embodiment of FIG. 11A and FIG. 11B, as shown in the figure, the identification information includes the first identifier and the second identifier; however, this is not construed as a limitation, and the identification information may alternatively include only the first identifier. Refer to the embodiment of FIG. 6.

For an implementation of sending, by the user equipment, the access request to the network authentication network element, refer to the embodiment of FIG. 6 or FIG. 7. Details are not described herein again.

A difference between the embodiments corresponding to FIG. 6 to FIG. 10A and FIG. 10B is that the user equipment may further simultaneously send, by using the RAN-side decodable signaling (for example, RRC signaling) channel, the identification information (for example, the device ID) of the user equipment, or the access assistance information related to the user equipment, such as the access priority. This can help the RAN perform access control based on the information.

In an implementation, the RAN-side decodable signaling may carry the identification information, for example, the device ID, namely, the second identifier. The access network RAN may determine an access policy for the user equipment based on the identification information. For example, if the device ID of the user equipment indicates that the user equipment is an IoT device (having a low priority), the access priority corresponding to the user equipment may be set to low on the access network side. After access of some current user equipments having high priorities is completed, the access priority of the IoT device is improved, and access processing is performed for the IoT device. This example is merely an implementation of this application, and should not be construed as a limitation, and there may be a difference in actual application.

In another implementation, the RAN-side decodable signaling may carry the access assistance information related to the user equipment, for example, the access priority. The access network RAN may determine an access policy for the user equipment based on the access assistance information. For example, if the access priority of the user equipment carried in the RAN-side decodable signaling is a high priority, the access network side may preferentially the access request of the user equipment, so that the user equipment can access a network in a timely manner. This meets an access time requirement of a low-latency device. This example is merely an implementation of this application, and should not be construed as a limitation, and there may be a difference in actual application.

In some embodiments, the RAN-side decodable signaling may carry both the identification information and the access assistance information related to the user equipment. The foregoing two implementations are not construed as a limitation. In one implementation, which information is to be carried may be determined based on a RAN-side access control mechanism.

It should be noted that the access priority may be set according to latency requirements of different types of devices, or may be set based on other factors to be considered, for example, may be set based on a service priority. The access assistance information is not limited to the access priority, and may be other information that can be used for RAN-side access control. No limitation is imposed In this disclosure.

e-S610: Correspondingly, the network authentication network element receives the access request. Then the network authentication network element may verify whether the first identifier is valid, and if the first identifier is valid, determine, based on the first identifier, a slice authentication network element corresponding to the user equipment.

In some embodiments, in a scenario in which the user equipment accesses one slice, for a one implementation of S605-S610, refer to S103-S108 in the embodiment of FIG. 6. To be specific, the slice authentication network element corresponding to the user equipment may be configured to: generate authentication data for the user equipment, and initiate a user authentication request to the user equipment by using the authentication data.

In some embodiments, in a scenario in which the user equipment accesses a plurality of slices, for a one implementation of S605-S610, refer to S403-S408 in the embodiment of FIG. 9A and FIG. 9B. To be specific, the slice authentication network element corresponding to the user equipment is shared by the plurality of network slices, and may be configured to: separately generate authentication data for the user equipment, and initiate a user authentication request to the user equipment by using the authentication data of each of the plurality of network slices.

In some embodiments, in a scenario in which the user equipment accesses a plurality of slices, for a one implementation of S605-S610, refer to S503-S508 in the embodiment of FIG. 11A and FIG. 11B. To be specific, a plurality of slice authentication network elements corresponding to the user equipment may be configured to: generate authentication data, for the user equipment, of a slice corresponding to each of the plurality of slice authentication network elements; and initiate a user authentication request to the user equipment by using the authentication data, for the user equipment, of the slice corresponding to each of the plurality of slice authentication network elements.

S611: The network authentication network element sends the first identifier and the second identifier to the slice authentication network element corresponding to the user equipment. In some embodiments, identification information sent by the network authentication network element to the slice authentication network element may include only information about the first identifier. Refer to the embodiment of FIG. 6. Optionally, identification information sent by the network authentication network element to the slice authentication network element may include only information about the second identifier. Refer to the embodiment of FIG. 7.

S612-S614: The slice authentication network element corresponding to the user equipment generates authentication data for the user equipment based on the first identifier and the second identifier. Refer to S310-S312 in the embodiment of FIG. 8A and FIG. 8B. Optionally, the slice authentication network element may generate authentication data for the user equipment based only on the information about the first identifier. Refer to S110-S112 in the embodiment of FIG. 6. Optionally, the slice authentication network element may generate authentication data for the user equipment based only on the information about the second identifier. Refer to S210-S212 in the embodiment of FIG. 7.

Herein, it should be noted that, in the embodiment of FIG. 11A and FIG. 11B, those shown in the figure are not construed as a limitation, and for one implementations of S611 and S612-S614, reference may be further made to corresponding steps in the embodiment of FIG. 9A and FIG. 9B, or FIG. 10A and FIG. 10B, so that S611 and S612-S614 are applicable to the scenario of a plurality of network slices corresponding to the embodiment of FIG. 9A and FIG. 9B, or FIG. 10A and FIG. 10B.

S615-S616: The slice authentication network element corresponding to the user equipment initiates a user authentication request to the user equipment by using the authentication data for the user equipment. Then the user equipment responds to the user authentication request.

Herein, it should be noted that, in the embodiment of FIG. 11A and FIG. 11B, those shown in the figure are not construed as a limitation, and for a one implementation of S615-S616, reference may be further made to corresponding steps in the embodiment of FIG. 9A and FIG. 9B, or FIG. 10A and FIG. 10B, so that S615-S616 are applicable to the scenario of a plurality of network slices corresponding to the embodiment of FIG. 9A and FIG. 9B, or FIG. 10A and FIG. 10B.

Figure 12A:
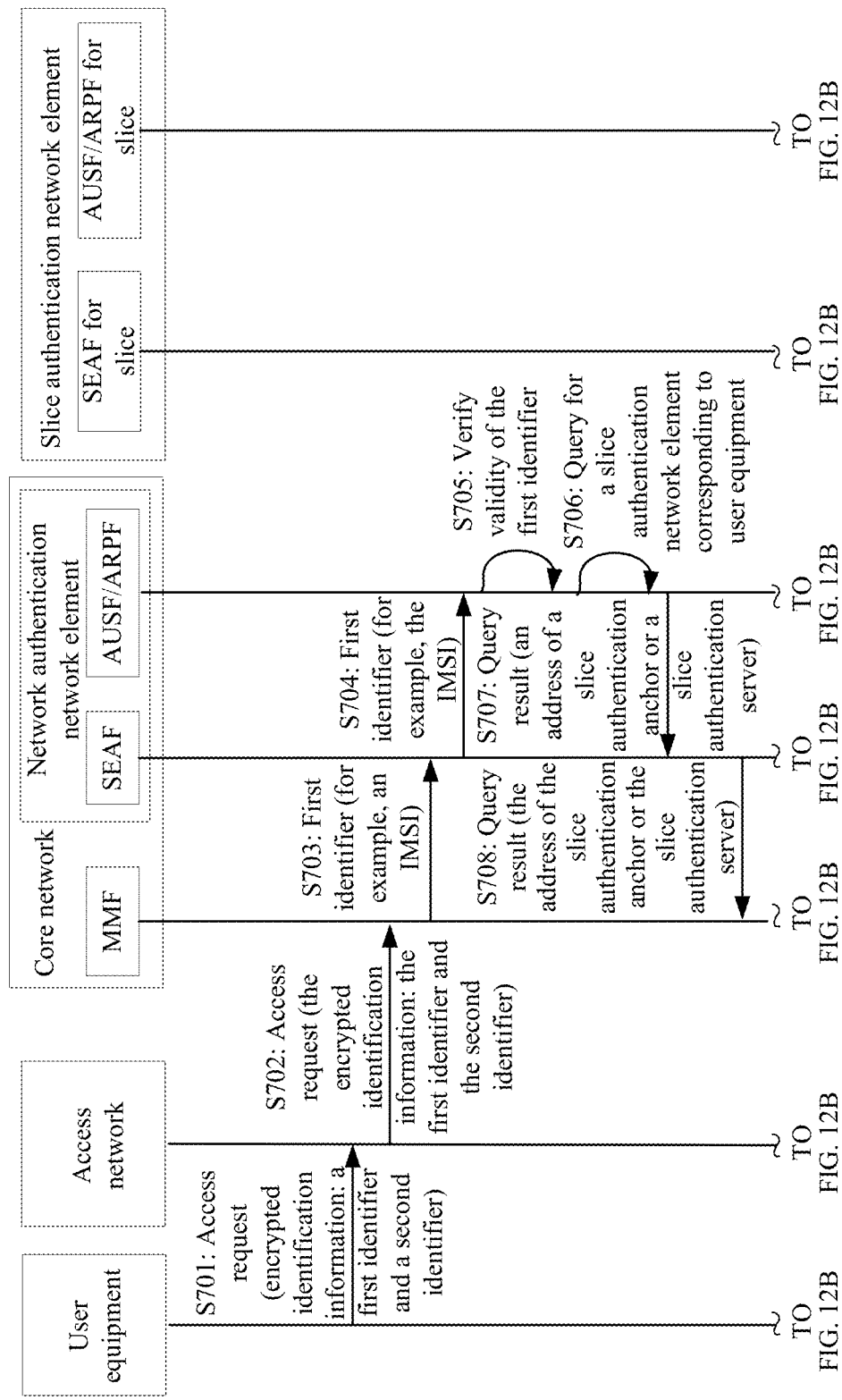
FIG. 12A and FIG. 12B is a schematic flowchart of a seventh embodiment of a network authentication method according to this application.
Figure 12B:
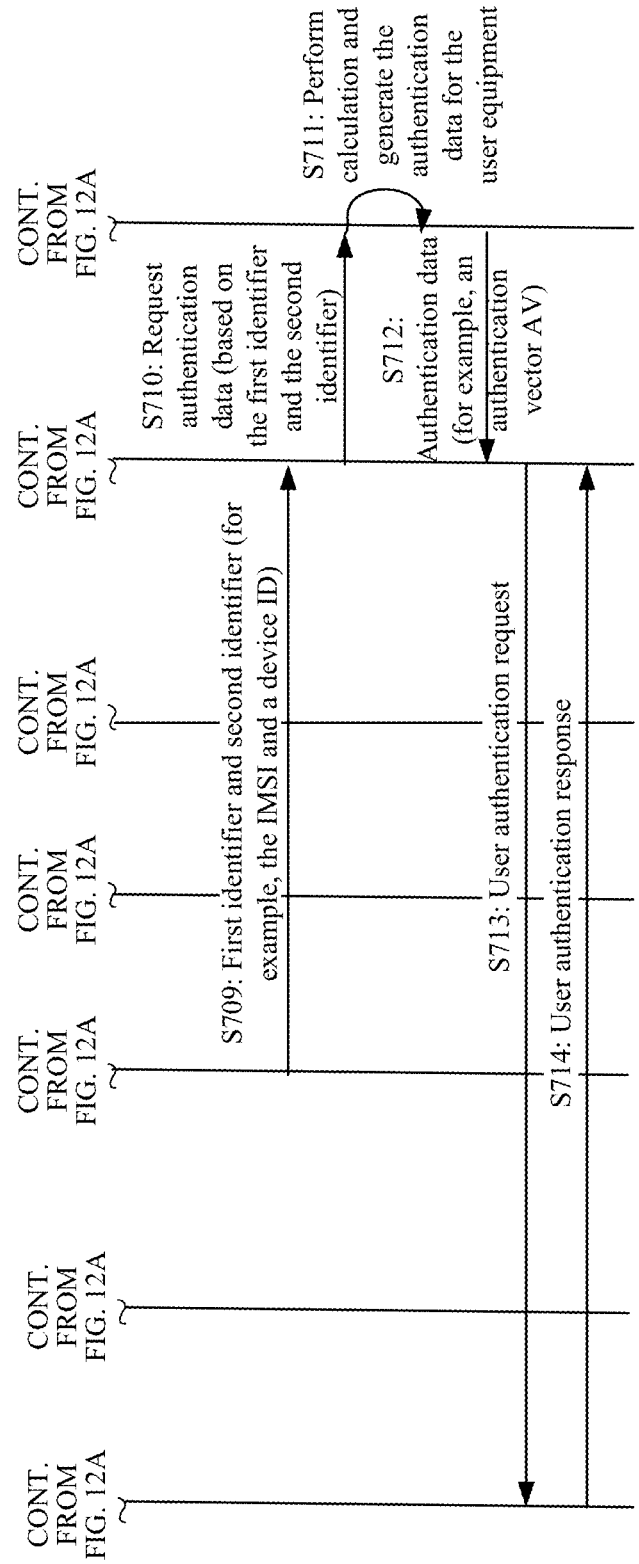

FIG. 12A and FIG. 12B is a schematic flowchart of a seventh embodiment of a network authentication method according to this application. In the embodiment of FIG. 12A and FIG. 12B, the user equipment may encrypt the identification information, to protect privacy and avoid a replay attack. In some embodiments, an encryption key (referred to as a first encryption key In this disclosure) provided by the network authentication network element (for example, a SEAF) may be used to encrypt the identification information, and then the encrypted identification information is embedded in the access request. The first encryption key may be preset for all user equipments, and a decryption key corresponding to the first encryption key may be configured on a side of the network authentication network element. In other words, the encrypted identification information can be decrypted only on the side of the network authentication network element, thereby improving security and privacy. Descriptions are provided below.

S701-S702: The user equipment sends the access request to the network authentication network element, where the access request includes the identification information of the user equipment. It should be noted that, in the embodiment of FIG. 12A and FIG. 12B, as shown in the figure, the identification information includes the first identifier and the second identifier; however, this is not construed as a limitation, and the identification information may alternatively include only the first identifier. Refer to the embodiment of FIG. 6.

For an implementation of S701-S702, refer to corresponding steps in the embodiments corresponding to FIG. 6 to FIG. 10A and FIG. 10B. Details are not described herein again. In addition, referring to the embodiment of FIG. 11A and FIG. 11B, it can be learned that the user equipment may further send, by using RAN-side decodable signaling, the identification information and/or access assistance information related to the user equipment, to implement RAN-side access control.

A difference from the embodiments corresponding to FIG. 6 to FIG. 11A and FIG. 11B is that, in the embodiment of FIG. 12A and FIG. 12B, the identification information carried in the access request is encrypted by the user equipment by using the first encryption key. The decryption key corresponding to the first encryption key may be configured on the side of the network authentication network element. In other words, the encrypted identification information can be decrypted only on the side of the network authentication network element, thereby improving security and privacy.

Herein, a key mechanism used by the first encryption key and the decryption key corresponding to the first encryption key is not limited. A common asymmetric key mechanism (for example, PKI) may be used, or a user-identity-based asymmetric key encryption/decryption mechanism (for example, IBS) may be used, or another type of key mechanism may be used.

Optionally, an effective time may be further embedded in the access request to further avoid a replay attack. In this way, the network authentication network element may additionally determine, based on the effective time, whether a source of the access request is valid.

S703-S708: Correspondingly, the network authentication network element receives the access request. Then the network authentication network element may verify whether the first identifier is valid, and if the first identifier is valid, determine, based on the first identifier, a slice authentication network element corresponding to the user equipment.

S709: The network authentication network element sends the first identifier and the second identifier to the slice authentication network element corresponding to the user equipment.

S710-S712: The slice authentication network element corresponding to the user equipment generates authentication data for the user equipment based on the first identifier and the second identifier.

S713: The slice authentication network element corresponding to the user equipment initiates a user authentication request to the user equipment by using the authentication data for the user equipment.

S714: The user equipment responds to the user authentication request.

Herein, it should be noted that, in the embodiment of FIG. 12A and FIG. 12B, those shown in the figure are not construed as a limitation, and for one implementations of S703-S714, reference may be further made to corresponding steps in the embodiments corresponding to FIG. 6 to FIG. 11A and FIG. 11B. Details are not described herein again.

Figure 13A:
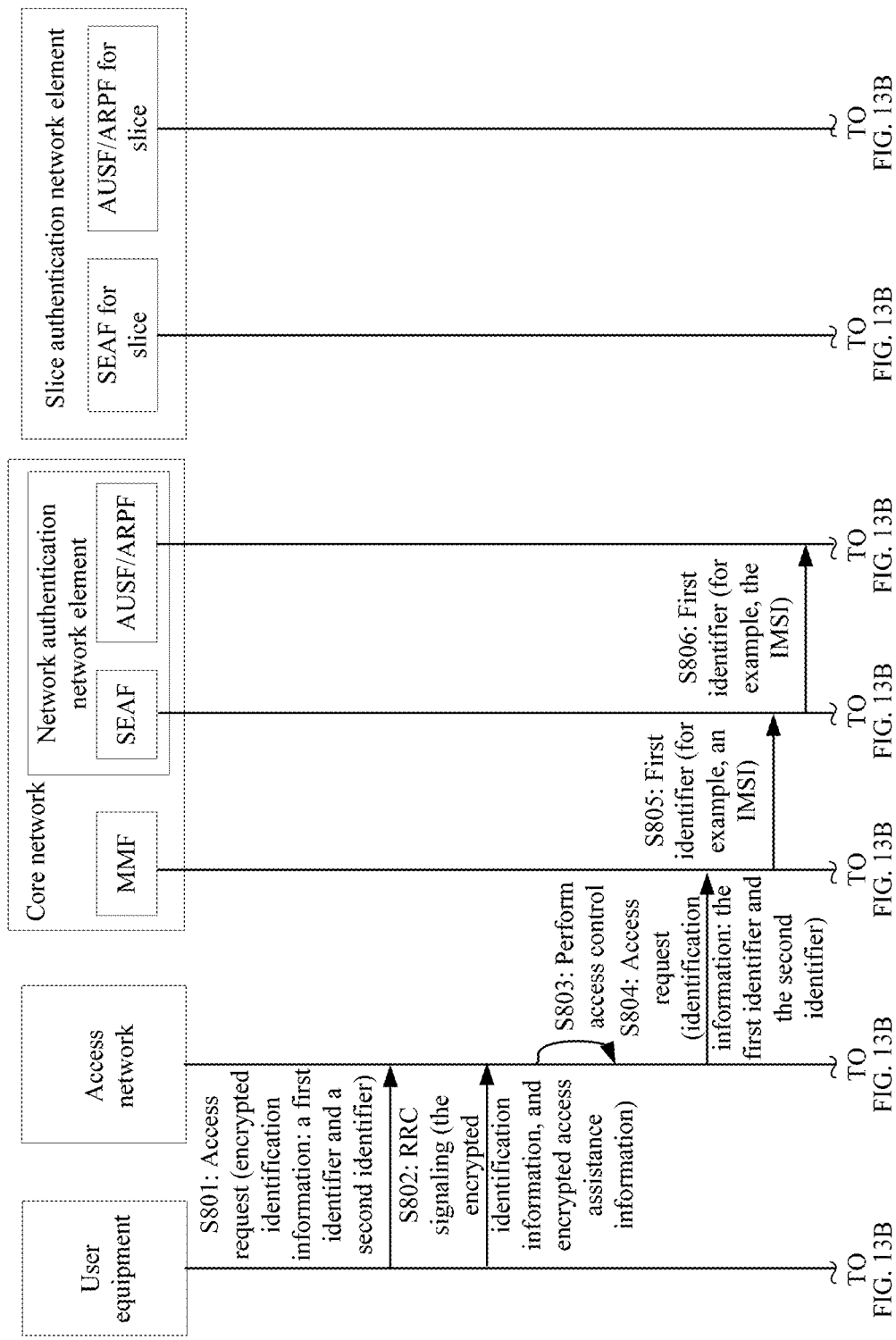
FIG. 13A and FIG. 13B is a schematic flowchart of an eighth embodiment of a network authentication method according to this application.
Figure 13B:
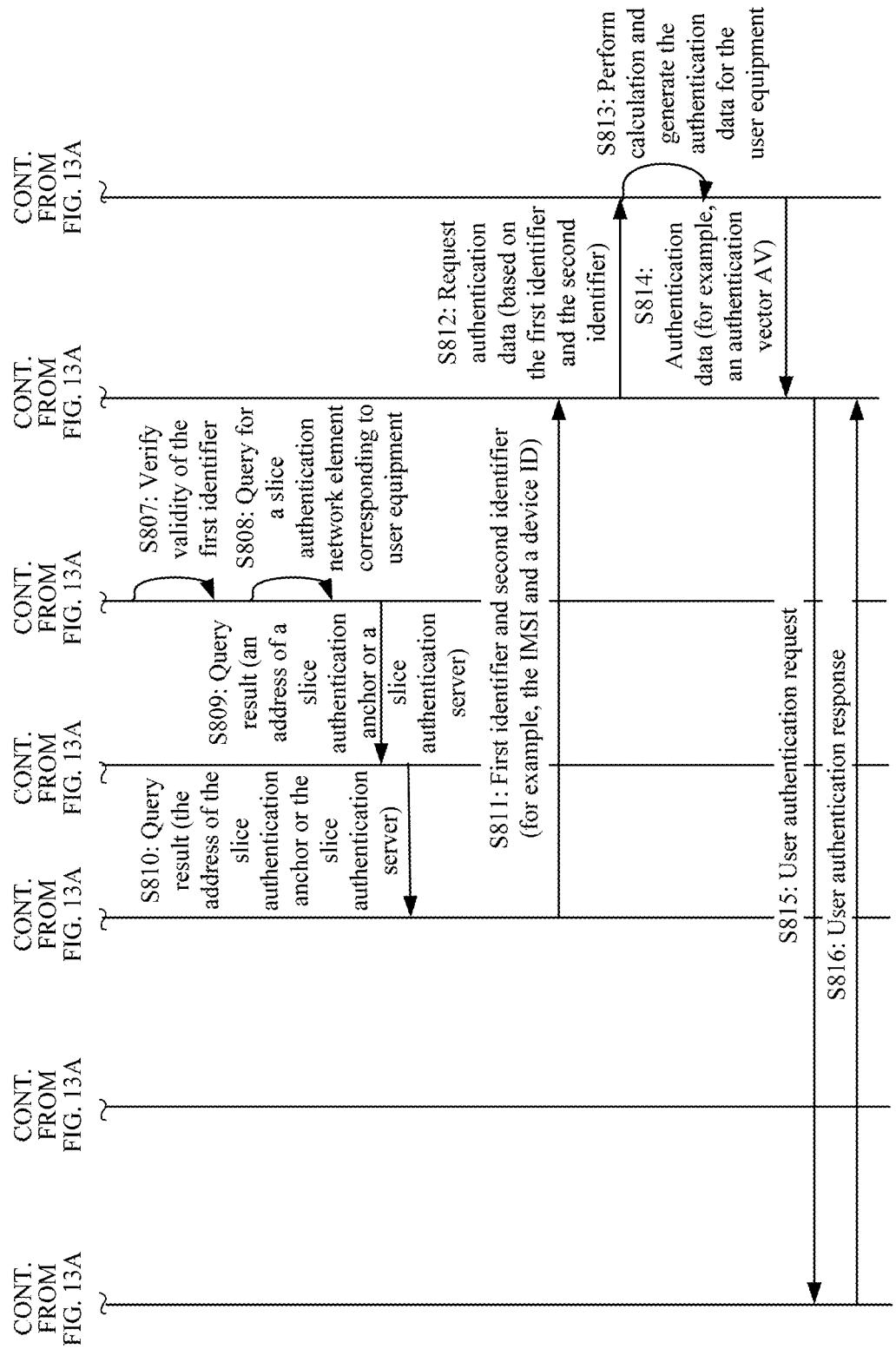

FIG. 13A and FIG. 13B is a schematic flowchart of an eighth embodiment of a network authentication method according to this application. Based on the embodiment of FIG. 11A and FIG. 11B, in the embodiment of FIG. 13A and FIG. 13B, the user equipment may encrypt not only the identification information carried in the access request (refer to the embodiment of FIG. 12A and FIG. 12B), but also the identification information and/or access assistance information carried on the RRC channel. In some embodiments, an encryption key (referred to as a second encryption key In this disclosure) provided by an access network RAN may be used to encrypt the identification information and/or the access assistance information, and then the encrypted identification information and/or access assistance information are/is embedded in the RAN-side decodable signaling. The second encryption key may be preset for all user equipments, and a decryption key corresponding to the second encryption key may be configured on a RAN side. In other words, the identification information and/or the access assistance information embedded in the RAN-side decodable signaling can be decrypted only on the RAN side, thereby improving security and privacy. Descriptions are provided below.

S801-S804: The user equipment sends the access request to an access-network network element, where the access request includes the identification information of the user equipment. When sending the access request, the user equipment may further send, to the access-network network element, the RAN-side decodable signaling carrying the identification information and/or the access assistance information related to the user equipment. The access-network network element performs access control on the access request of the user equipment based on the identification information and/or the access assistance information. Finally, the access-network network element forwards the access request to the network authentication network element.

For details, refer to S601-S604 in the embodiment of FIG. 11A and FIG. 11B. Details are not described herein again.

Differences from the embodiment of FIG. 11A and FIG. 11B are as follows:

First, the identification information carried in the access request is encrypted by the user equipment by using the first encryption key. For details, refer to the embodiment of FIG. 12A and FIG. 12B. The encrypted identification information can be decrypted only on a side of the network authentication network element, thereby improving security and privacy.

Second, the identification information and/or the access assistance information carried in the RAN-side decodable signaling are/is encrypted by the user equipment by using the second encryption key. The second encryption key may be preset for all the user equipments, and the decryption key corresponding to the second encryption key may be configured on the RAN side. The encrypted identification information and/or access assistance information can be decrypted only on the RAN side, thereby improving security and privacy.

In one implementation, similar to that used for encrypting the identification information in the access request in the embodiment of FIG. 12A and FIG. 12B, a key mechanism used by the second encryption key and the decryption key corresponding to the second encryption key is not limited herein. A common asymmetric key mechanism (for example, PKI) may be used, or a user-identity-based asymmetric key encryption/decryption mechanism (for example, IBS) may be used, or another type of key mechanism may be used. Optionally, an effective time may be further embedded in the RRC to further avoid a replay attack. In this way, the RAN may additionally determine, based on the effective time, whether a source of the RAN-side decodable signaling is valid.

S805-S810: Correspondingly, the network authentication network element receives the access request. Then the network authentication network element may verify whether the first identifier is valid, and if the first identifier is valid, determine, based on the first identifier, a slice authentication network element corresponding to the user equipment.

S811: The network authentication network element sends the first identifier and the second identifier to the slice authentication network element corresponding to the user equipment.

S812-S814: The slice authentication network element corresponding to the user equipment generates authentication data for the user equipment based on the first identifier and the second identifier.

S815: The slice authentication network element corresponding to the user equipment initiates a user authentication request to the user equipment by using the authentication data for the user equipment.

S816: The user equipment responds to the user authentication request.

Herein, it should be noted that, in the embodiment of FIG. 13A and FIG. 13B, those shown in the figure are not construed as a limitation, and for one implementations of S805-S816, reference may be further made to corresponding steps in the embodiments corresponding to FIG. 6 to FIG. 12A and FIG. 12B. Details are not described herein again.

Figure 14:
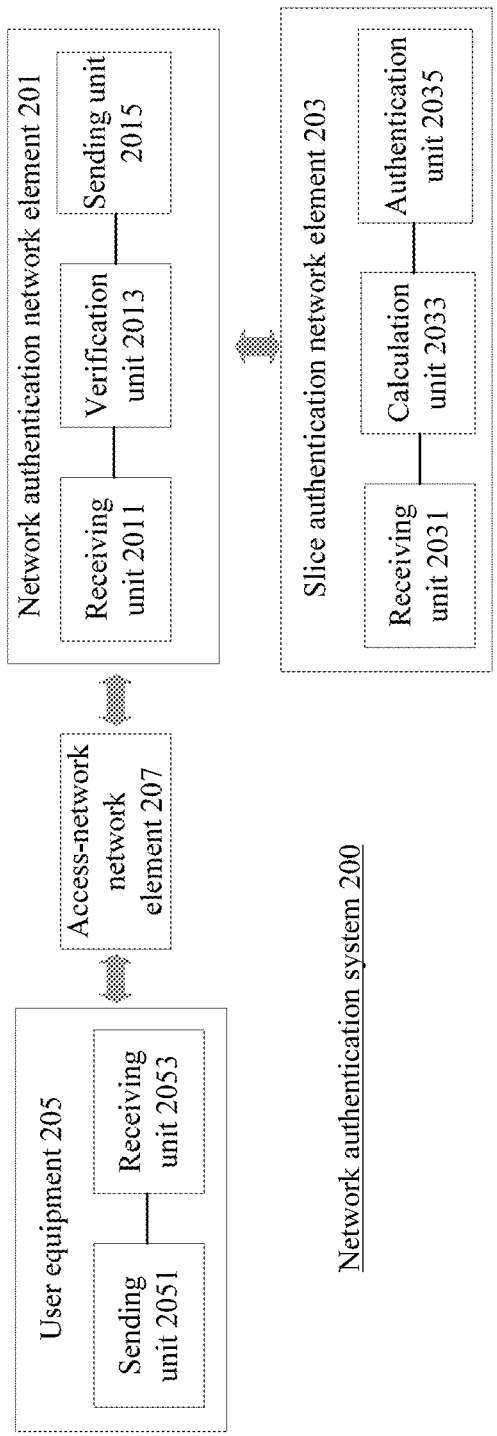
FIG. 14 is a schematic structural diagram of a network authentication system and related network elements in the network authentication system according to this application.

FIG. 14 is a schematic structural diagram of a network authentication system and related network elements in the network authentication system according to this application. As shown in FIG. 14, the network authentication system 200 may include a network authentication network element 201, a slice authentication network element 203, user equipment 205, and an access-network network element 207. Descriptions are provided below.

As shown in FIG. 14, the network authentication network element 201 may include a receiving unit 2011, a verification unit 2013, and a sending unit 2015.

The receiving unit 2011 may be configured to receive an access request sent by the user equipment 205, where the access request includes identification information of the user equipment 205.

The verification unit 2013 may be configured to: verify whether some or all of the identification information is valid; and if some or all of the identification information is valid, determine, based on the some or all of the identification information that is valid, a slice authentication network element 203 corresponding to the user equipment 205.

The sending unit 2015 may be configured to send the some or all of the identification information to the slice authentication network element 203 corresponding to the user equipment 205, where the some or all of the identification information that is sent is used by the slice authentication network element 203 corresponding to the user equipment 205 to generate authentication data for the user equipment 205 and initiate a user authentication request to the user equipment 205 by using the authentication data.

In an implementation, the identification information may include at least a first identifier, and the first identifier is network-side identification information of the user equipment 205.

In an implementation, the identification information may include at least a first identifier and a second identifier, the first identifier is network-side identification information of the user equipment 205, and the second identifier includes at least one of a service identifier and a physical identifier.

In one implementation, the sending unit 2015 may be in some embodiments configured to send the second identifier to the slice authentication network element 203. The slice authentication network element 203 may be configured to: generate the authentication data based on the second identifier, and initiate the user authentication request to the user equipment 205 by using the authentication data.

In one implementation, alternatively, the sending unit 2015 may be in some embodiments configured to send the first identifier and the second identifier to the slice authentication network element 203. The slice authentication network element 203 is configured to: generate the authentication data based on the first identifier and the second identifier, and initiate the user authentication request to the user equipment 205 by using the authentication data.

In some embodiments, the user equipment 205 may be corresponding to a plurality of network slices. The verification unit 2013 may be in some embodiments configured to determine, based on the some or all of the identification information that is valid, a slice authentication network element 203 corresponding to each of the plurality of network slices. The sending unit 2015 may be in some embodiments configured to send the some or all of the identification information to the slice authentication network element 203 corresponding to each of the plurality of network slices. The slice authentication network element 203 corresponding to each of the plurality of network slices is configured to: separately generate authentication data for the user equipment 205, and initiate a user authentication request to the user equipment 205 by using the authentication data of each of the plurality of network slices for the user equipment 205.

It should be noted that, for one implementations of the functional units in the network authentication network element 201, reference may be further made to functions of the network authentication network element in the embodiments corresponding to FIG. 5 to FIG. 13A and FIG. 13B. Details are not described herein again.

As shown in FIG. 14, the slice authentication network element 203 may include a receiving unit 2031, a calculation unit 2033, and an authentication unit 2035.

The receiving unit 2031 may be configured to receive the identification information of the user equipment that is sent by the network authentication network element 201.

The calculation unit 2033 may be configured to generate the authentication data for the user equipment 205 based on the identification information.

The authentication unit 2035 may be configured to initiate the user authentication request to the user equipment 205 by using the authentication data.

In an implementation, the identification information may include at least the first identifier, and the first identifier is the network-side identification information of the user equipment 205.

In an implementation, the identification information may include at least the first identifier and the second identifier, the first identifier is the network-side identification information of the user equipment 205, and the second identifier includes at least one of the service identifier and the physical identifier.

In one implementation, the receiving unit 2031 may be in some embodiments configured to receive the first identifier and the second identifier sent by the network authentication network element 201. The calculation unit may be in some embodiments configured to generate the authentication data for the user equipment 205 based on the first identifier.

In one implementation, alternatively, the receiving unit 2031 may be in some embodiments configured to receive the first identifier and the second identifier sent by the network authentication network element 201. Alternatively, the calculation unit 2033 may be in some embodiments configured to generate the authentication data for the user equipment 205 based on the first identifier and the second identifier.

In some embodiments, the calculation unit 2033 may be in some embodiments configured to generate, based on the identification information, the authentication data of each of the plurality of network slices for the user equipment 205. The authentication unit 2035 may be in some embodiments configured to initiate, to the user equipment 205, a security authentication request for each of the network slices by using the authentication data of each of the plurality of network slices for the user equipment 205.

It should be noted that, for one implementations of the functional units in the slice authentication network element 203, reference may be further made to functions of the slice authentication network element in the embodiments corresponding to FIG. 5 to FIG. 13A and FIG. 13B. Details are not described herein again.

As shown in FIG. 14, the user equipment 205 may include:

a sending unit 2051, configured to send the access request to the network authentication network element 201, where the access request carries the identification information of the user equipment 205; and a receiving unit 2053, configured to: receive the user authentication request initiated by the slice authentication network element, and respond to the user authentication request.

In an implementation, the identification information may include at least the first identifier, and the first identifier is the network-side identification information of the user equipment 205.

In an implementation, the identification information may include at least the first identifier and the second identifier, the first identifier is the network-side identification information of the user equipment 205, and the second identifier includes at least one of the service identifier and the physical identifier.

In some embodiments, the user equipment 205 may further include a first encryption unit, configured to: before the sending unit 2051 sends the access request, encrypt the identification information by using a first encryption key. A decryption key corresponding to the first encryption key is configured on a side of the network authentication network element 201. The network authentication network element 201 is configured to decrypt the encrypted identification information by using the decryption key corresponding to the first encryption key.

In some embodiments, the sending unit 2051 may be further configured to: when sending the access request to the network authentication network element 201, send, to an access-network network element, access-network-side decodable signaling carrying the identification information and/or access assistance information related to the user equipment 205. The access-network network element decodable signaling is used by the access-network network element to perform access control on the access request of the user equipment 205 based on the identification information and/or the access assistance information.

In some embodiments, the user equipment 205 may further include a second encryption unit, configured to: before the sending unit 2051 sends the access-network-side decodable signaling, encrypt, by using a second encryption key, the identification information and/or the access assistance information carried in the access-network-side decodable signaling. A decryption key corresponding to the second encryption key is configured on the access-network network element. The access-network network element is configured to decrypt the encrypted identification information and/or access assistance information by using the decryption key corresponding to the first encryption key.

It should be noted that, for one implementations of the functional units in the user equipment 205, reference may be further made to functions of the user equipment in the embodiments corresponding to FIG. 5 to FIG. 13A and FIG. 13B. Details are not described herein again.

To sum up, according to this application, user equipment can quickly and efficiently access a network slice, and security protection is ensured when the user equipment accesses a network.

A person of ordinary skill in the art may understand that all or some of the processes of the methods in the embodiments may be implemented by a computer program by instructing relevant hardware. The program may be stored in a computer readable storage medium. When the program runs, the processes of the methods in the embodiments may be performed. The storage medium may be a magnetic disc, an optical disc, a read-only memory (Read-Only Memory, ROM), a random access memory (Random Access Memory, RAM), or the like.

What is claimed is:

1. A network authentication system, comprising:
a base station;
a mobility management network element; and
a slice authentication network element, wherein:
the base station is configured to receive an access request carrying a first identifier from a user equipment (UE) and send the access request to the mobility management network element;
the mobility management network element is configured to receive the access request;
the mobility management network element is further configured to send, based on the first identifier being valid, a second identifier to the slice authentication network element corresponding to the UE;
the slice authentication network element is configured to receive the second identifier and send a first user authentication message to the UE based on the second identifier, wherein the first user authentication message comprises a first identifier and a slice identifier; and the slice authentication network element is configured to receive a second user authentication message from the UE in response to the first user authentication message.

2. The network authentication system according to claim 1, wherein the first identifier comprises identification information of the UE in an operator network.

3. The network authentication system according to claim 1, wherein the second identifier comprises identification information of the UE for network slice authentication.

4. The network authentication system according to claim 1, wherein the second identifier comprises at least one of a physical identifier and a service identifier of the UE.

5. The network authentication system according to claim 1, wherein the slice authentication network element corresponding to the UE is determined based on the first identifier.

6. The network authentication system according to claim 1, wherein the mobility management network element is further configured to send, based on the first identifier being valid, the first identifier to the slice authentication network element corresponding to the UE; and
the slice authentication network element is configured to send the first user authentication message to the UE based on the first identifier and the second identifier.

7. The network authentication system according to claim 1, wherein the first identifier being valid is by virtue of the security context of the UE identified by the first identifier being valid.

8. The network authentication system according to claim 1, wherein the first identifier being valid is by virtue of the UE identified by the first identifier being not deregistered.

9. A network authentication method, comprising:
receiving, by a base station, an access request from a user equipment (UE), the access request carrying a first identifier;
sending, by the base station, the access request to a mobility management network element;
receiving, by the mobility management network element, the access request;
sending, by the mobility management network element, based on the first identifier being valid, a second identifier to a slice authentication network element corresponding to the UE;
receiving, by the slice authentication network element, the second identifier;
sending a first user authentication message to the UE based on the second identifier, wherein the first user authentication message comprises a first identifier and a slice identifier; and
receiving, by the slice authentication network element, a second user authentication message from the UE.

10. The network authentication method according to claim 9, wherein the first identifier comprises identification information of the UE in an operator network.

11. The network authentication method according to claim 9, wherein the second identifier comprises identification information of the UE for network slice authentication.

12. The network authentication method according to claim 9, wherein the second identifier comprises at least one of a physical identifier and a service identifier of the UE.

13. The network authentication method according to claim 9, wherein the slice authentication network element corresponding to the UE is determined based on the first identifier.

14. The network authentication method according to claim 9, further comprising:
sending, by the mobility management network element, based on the first identifier being valid, the first identifier to the slice authentication network element corresponding to the UE; and
sending, the first user authentication message to the UE based on the second identifier comprises:
sending, by the slice authentication network element, the first user authentication message to the UE based on the first identifier and the second identifier.

15. The network authentication method according to claim 9, wherein the first identifier being valid is by virtue of the security context of the UE identified by the first identifier being valid.

16. The network authentication method according to claim 9, wherein the first identifier being valid comprises: the UE identified by the first identifier being not deregistered.

* * * * *